US012611762B2

(12) United States Patent
Hartmann et al.

(10) Patent No.: US 12,611,762 B2
(45) Date of Patent: Apr. 28, 2026

(54) SYSTEM WITH A POWER TOOL AND AN ENERGY SUPPLY DEVICE, AND INTERFACE, AND ENERGY SUPPLY DEVICE

(71) Applicant: Hilti Aktiengesellschaft, Schaan (LI)

(72) Inventors: Markus Hartmann, Mauerstetten (DE); Robert Stanger, Kaufbeuren (DE); Markus Holubarsch, Landsberg am Lech (DE); Stefan Schmid, Untermühlhausen (DE); Jens Kondratiuk, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 1 day.

(21) Appl. No.: 18/714,734

(22) PCT Filed: Nov. 15, 2022

(86) PCT No.: PCT/EP2022/081932
§ 371 (c)(1),
(2) Date: May 30, 2024

(87) PCT Pub. No.: WO2023/099203
PCT Pub. Date: Jun. 8, 2023

(65) Prior Publication Data

US 2025/0033182 A1 Jan. 30, 2025

(30) Foreign Application Priority Data

Dec. 1, 2021 (EP) .................................... 20211575
Dec. 1, 2021 (EP) .................................... 21211570
Jan. 11, 2022 (EP) .................................... 22150915

(51) Int. Cl.
*B25F 5/02* (2006.01)
*B25F 5/00* (2006.01)

(52) U.S. Cl.
CPC ................ *B25F 5/02* (2013.01); *B25F 5/006* (2013.01)

(58) Field of Classification Search
CPC .................................. B25F 5/02; B25F 5/006
See application file for complete search history.

(56) References Cited

U.S. PATENT DOCUMENTS 4,794,273 A 12/1988 McCoullough et al.
6,675,912 B2 1/2004 Carrier et al.
(Continued)

FOREIGN PATENT DOCUMENTS

CN 206274616 U * 6/2017 ........... H02J 7/0013
CN 206689480 U 12/2017
(Continued)

*Primary Examiner* — Lucas E. A. Palmer
(74) *Attorney, Agent, or Firm* — Davidson Kappel LLC

(57) ABSTRACT

A system including a power tool and an energy supply device, wherein the energy supply device is provided for supplying the power tool with electrical energy. The energy supply device can be releasably connected to the power tool via an interface, wherein the interface includes at least a female contact partner and a male contact partner. The female contact partner and the male contact partner are in contact with each other in at least a first contact region and in a second contact region. The first contact region may be defined by a first contact normal force, while the second contact region may be defined by a second contact normal force, wherein the first contact normal force and the second contact normal force have different orientations. In addition, the interface can include an elastic means for reducing the relative movement between the male contact partner and the female contact partner. An interface for transmitting electrical energy, and to an energy supply device is also provided.

23 Claims, 10 Drawing Sheets

(56) References Cited

U.S. PATENT DOCUMENTS

| | | | | |
|---|---|---|---|---|
| 7,119,516 | B2 | 10/2006 | Denning et al. | |
| 7,719,229 | B2 * | 5/2010 | Kaneko | G05D 1/0225 446/175 |
| 7,900,524 | B2 | 3/2011 | Calloway et al. | |
| 11,205,820 | B2 | 12/2021 | Hanawa et al. | |
| 2003/0054230 | A1 | 3/2003 | Al-Hallaj et al. | |
| 2003/0174449 | A1 * | 9/2003 | Yamamoto | B25B 21/00 361/23 |
| 2004/0146777 | A1 | 7/2004 | Forlino et al. | |
| 2004/0175609 | A1 | 9/2004 | Yageta et al. | |
| 2005/0221654 | A1 * | 10/2005 | Phillips | H01M 50/267 439/347 |
| 2007/0210744 | A1 | 9/2007 | Watson et al. | |
| 2008/0084181 | A1 | 4/2008 | Griffin et al. | |
| 2008/0102684 | A1 | 5/2008 | Matthias et al. | |
| 2009/0148755 | A1 | 6/2009 | Heinzen et al. | |
| 2009/0269654 | A1 | 10/2009 | Kairawicz et al. | |
| 2010/0176766 | A1 | 7/2010 | Brandner et al. | |
| 2012/0040235 | A1 | 2/2012 | Cho et al. | |
| 2012/0293096 | A1 | 11/2012 | Mizoguchi et al. | |
| 2013/0278222 | A1 | 10/2013 | Seiler et al. | |
| 2014/0087246 | A1 | 3/2014 | Yamamoto et al. | |
| 2014/0131059 | A1 | 5/2014 | Verbrugge et al. | |
| 2014/0147718 | A1 | 5/2014 | Furui et al. | |
| 2014/0326477 | A1 | 11/2014 | Thorson et al. | |
| 2015/0151423 | A1 | 6/2015 | Burger et al. | |
| 2015/0357683 | A1 | 12/2015 | Lohr et al. | |
| 2016/0072106 | A1 | 3/2016 | Baumgartner et al. | |
| 2016/0072269 | A1 | 3/2016 | Eschendal et al. | |
| 2016/0126533 | A1 | 5/2016 | Velderman et al. | |
| 2017/0346324 | A1 | 11/2017 | Hunger et al. | |
| 2017/0352847 | A1 | 12/2017 | Klee et al. | |
| 2018/0069208 | A1 | 3/2018 | Rejman et al. | |
| 2018/0248418 | A1 | 8/2018 | Walme et al. | |
| 2018/0366697 | A1 | 12/2018 | Elfering et al. | |
| 2019/0259984 | A1 | 8/2019 | Nishikawa et al. | |
| 2019/0259985 | A1 | 8/2019 | Hanawa et al. | |
| 2019/0326716 | A1 | 10/2019 | Nowalis et al. | |
| 2019/0334302 | A1 | 10/2019 | Maier et al. | |
| 2020/0094329 | A1 * | 3/2020 | Meixner | H01M 50/247 |
| 2020/0127339 | A1 * | 4/2020 | Nakano | H01M 50/213 |
| 2020/0153142 | A1 * | 5/2020 | Meixner | B25F 5/02 |
| 2020/0162007 | A1 | 5/2020 | Sheeks et al. | |
| 2020/0215680 | A1 | 7/2020 | Meixner et al. | |
| 2021/0246615 | A1 | 8/2021 | Gaspard et al. | |
| 2022/0181813 | A1 | 6/2022 | Meixner et al. | |
| 2022/0260440 | A1 | 8/2022 | Goyal et al. | |
| 2022/0288764 | A1 | 9/2022 | Hauser et al. | |
| 2023/0091858 | A1 | 3/2023 | Kim et al. | |
| 2025/0006399 | A1 * | 1/2025 | Hartmann | H01B 1/026 |
| 2025/0010451 | A1 * | 1/2025 | Hartmann | H02J 7/00 |
| 2025/0030195 | A1 * | 1/2025 | Hartmann | H01R 13/6315 |
| 2025/0033182 | A1 * | 1/2025 | Hartmann | B25F 5/02 |

FOREIGN PATENT DOCUMENTS

| | | | | |
|---|---|---|---|---|
| CN | 210684352 | U | 6/2020 | |
| CN | 111816818 | A | 10/2020 | |
| CN | 112 670723 | | 4/2021 | |
| CN | 118234599 | A * | 6/2024 | H01R 13/6315 |
| CN | 120184622 | A * | 6/2025 | |
| DE | 202007014418 | U1 | 12/2007 | |
| DE | 102006050816 | A1 | 4/2008 | |
| DE | 102012209925 | A1 | 12/2013 | |
| DE | 21 2012 000140 | U1 | 2/2014 | |
| DE | 102013226232 | A1 | 6/2014 | |
| DE | 102013008829 | A1 | 11/2014 | |
| DE | 102014110073 | A1 | 1/2016 | |
| DE | 10 2014 217987 | A1 | 3/2016 | |
| DE | 10 2015 110308 | A1 | 9/2016 | |
| DE | 102016203431 | A1 | 9/2016 | |
| DE | 102016209965 | A1 | 12/2017 | |
| DE | 10 2016 120329 | A1 | 4/2018 | |
| DE | 102017217495 | A1 | 4/2019 | |
| DE | 102017217503 | A1 | 4/2019 | |
| EP | 2178135 | A1 | 4/2010 | |
| EP | 2416407 | A1 | 2/2012 | |
| EP | 2207249 | B1 | 7/2015 | |
| EP | 3035484 | A1 | 6/2016 | |
| EP | 3340364 | A1 | 6/2018 | |
| EP | 3392974 | A1 | 10/2018 | |
| EP | 3395505 | A1 | 10/2018 | |
| EP | 3014690 | B1 | 3/2020 | |
| EP | 3 651227 | A1 | 5/2020 | |
| EP | 3653340 | A1 | 5/2020 | |
| EP | 3756831 | A1 | 12/2020 | |
| EP | 3834992 | A1 | 6/2021 | |
| GB | 2431433 | A | 4/2007 | |
| JP | 2004001193 | A * | 1/2004 | H01R 13/03 |
| JP | 2007105816 | A | 4/2007 | |
| JP | 2013196817 | A | 9/2013 | |
| JP | 2023515508 | A | 4/2023 | |
| WO | WO 2011051174 | A1 | 5/2011 | |
| WO | WO 2012084394 | A1 | 6/2012 | |
| WO | WO2016170476 | A1 | 10/2016 | |
| WO | WO 2019030030 | A1 | 2/2019 | |
| WO | WO2020247326 | A1 | 12/2020 | |
| WO | WO2021108118 | A1 | 6/2021 | |
| WO | WO2019243756 | A1 | 8/2021 | |
| WO | WO 2023/099146 | A1 | 6/2023 | |
| WO | WO2023/099155 | A1 | 6/2023 | |
| WO | WO2023/099163 | A1 | 6/2023 | |
| WO | WO2023/099165 | A1 | 6/2023 | |
| WO | WO2023/099184 | A1 | 6/2023 | |
| WO | WO2023/099186 | A1 | 6/2023 | |
| WO | WO2023/099195 | A1 | 6/2023 | |
| WO | WO 2023/099196 | A1 | 6/2023 | |
| WO | WO 2023/099198 | A1 | 6/2023 | |
| WO | WO2023/099202 | A2 | 6/2023 | |
| WO | WO2023/099203 | A1 | 6/2023 | |
| WO | WO2023/099653 | A1 | 6/2023 | |
| WO | WO2023099149 | A1 | 6/2023 | |
| WO | WO2023099156 | A1 | 6/2023 | |
| WO | WO2023099168 | A1 | 6/2023 | |
| WO | WO2023099169 | A1 | 6/2023 | |
| WO | WO2023099181 | A1 | 6/2023 | |
| WO | WO2023099182 | A1 | 6/2023 | |
| WO | WO2023099183 | A1 | 6/2023 | |
| WO | WO2023099194 | A1 | 6/2023 | |
| WO | WO2023099197 | A1 | 6/2023 | |
| WO | WO2023099199 | A1 | 6/2023 | |

* cited by examiner

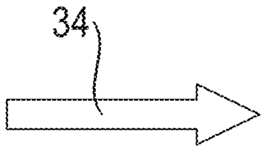
Fig. 5a)
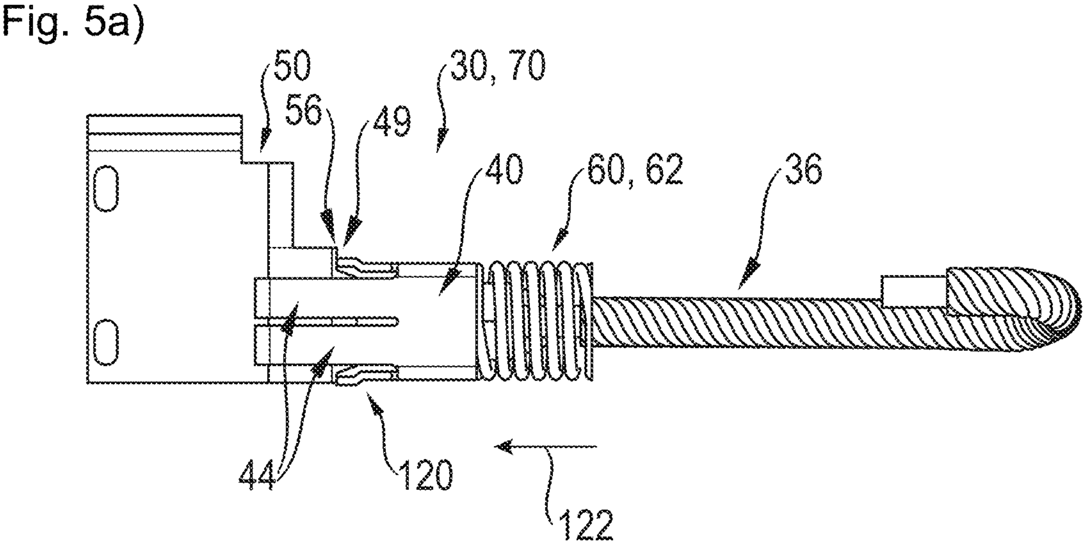
Fig. 5b)
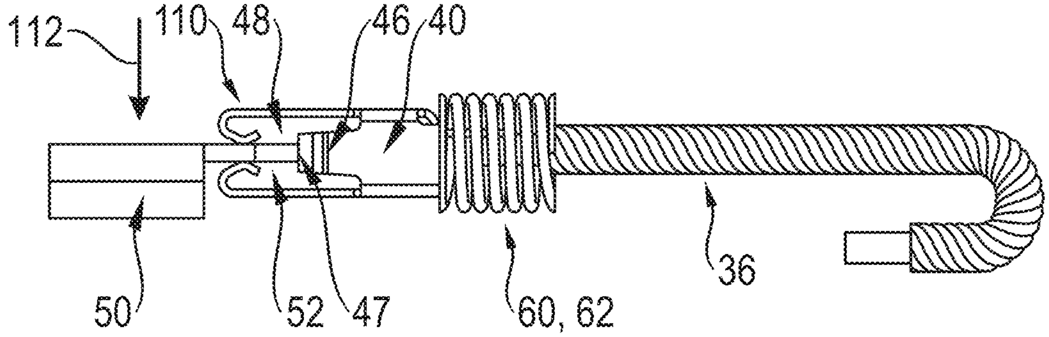

SYSTEM WITH A POWER TOOL AND AN ENERGY SUPPLY DEVICE, AND INTERFACE, AND ENERGY SUPPLY DEVICE

The present invention relates to a system comprising a power tool and an energy supply device, wherein the energy supply device is provided for supplying the power tool with electrical energy. In further aspects, the invention relates to an interface for transmitting electrical energy, and to an energy supply device.

BACKGROUND OF THE INVENTION

So-called cordless power tools, for example storage-battery-powered screwdrivers, drills, saws, grinders or the like, may be connected to an energy supply device in order to be supplied with energy. The energy supply device may for example be configured as or comprise a storage battery. Storage batteries usually have a multiplicity of energy storage cells, also known as storage battery cells, by means of which electrical energy can be received, stored and released again. If the storage battery is connected to a power tool, the electrical energy stored in the energy storage cells can be fed to the consumers (e.g. a brushless electric motor) of the power tool. For charging purposes, i.e. for loading the energy storage cells with electrical energy, the storage battery is connected to a charging device, such as a charger, such that electrical energy can enter the energy storage cells.

SUMMARY OF THE INVENTION

When using or working with a battery-operated power tool, significant vibrations and shocks may occur in the power tool and in the energy supply device connected to the power tool. This is especially the case if the power tool is a demolition tool, e.g. a chipping or demolition hammer. The vibrations and shocks during the use of the power tool place a certain amount of strain on virtually all components and assemblies of the power tool and of the energy supply device. This strain may ultimately result in damage to the respective components or even to a total failure of the power tool as a whole.

The interface between the power tool and the energy supply device constitutes a particular technical challenge. At the interface, the electrical contacts of the power tool and the electrical contacts of the energy supply device ("contact partners") are connected to one another such that the electrical energy stored in the energy storage cells may be transferred from the storage battery to the power tool.

In particular, conventional interfaces, as known from the prior art, have contacts for the transmission of electrical energy in which so-called contact normal forces act only in one direction, for example in a clamping or plugging direction. For the purposes of the invention, the term "contact normal force" is understood to mean the force acting in a contact region between the contact partners of an interface. In other words, it may refer to those forces with which the contact partners are pressed against each other to form a contact. In this context, high contact normal forces are desirable on the one hand to obtain good mechanical contact between the power contacts. On the other hand, the contact normal forces should also not become too large in order to keep undesirable plugging cycle wear low.

Another disadvantage of conventional interfaces is that they often have only one contact region for transferring electrical energy, and so the energy transfer potential of the interface might not be optimally utilized.

For example, US 2016 0126 533 A1 relates to a transport system for convertible battery packs, wherein a transport coupler is disclosed that can reduce a capacity of the battery pack during transport.

DE 10 2016 120 329 A1 describes a connection device for an electrical device or energy accumulator.

JP 2007 105 816 A describes a battery-powered power tool, in particular a connection structure between a terminal on a housing of the power tool and a terminal on the battery, while US 2008 0084 181 A1 describes a self-adjusting terminal block for a battery pack.

US 2014 0326 477 A1 describes a power tool with an insulation system for a battery pack.

EP 3 653 340 A1 discloses a hand-held power tool with a battery interface.

It is an object of the present invention to overcome the deficiencies and disadvantages of the prior art described above and to provide an interface and a system consisting of a power tool and an energy supply device, with which the transmission of particularly high discharge currents or large amounts of electrical energy from the energy supply device to the power tool can be made possible and the service life of the interface can be extended. In particular, those skilled in the art would like to see the interface continue to operate optimally even after many plugging or clamping cycles and function robustly in the face of minor mechanical deviations.

According to the invention, a system comprising a power tool and an energy supply device is provided, wherein the energy supply device is configured for supplying the power tool with electrical energy. The energy supply device can be releasably connected to the power tool via an interface, wherein the interface comprises at least a female contact partner and a male contact partner. The female contact partner and the male contact partner are in contact with each other in a first contact region and in a second contact region. In the context of the invention, this preferably means that the interface comprises a first and a second contact region, wherein the at least one female and the at least one male contact partner are in contact with each other in the contact regions of the interface. Consequently, the at least one female and the at least one male contact partner may form a pair of power contacts, wherein electrical current or electrical energy is exchanged between the power contacts via the contact regions. In the context of the invention, it is particularly preferred that the electrical energy flows from the energy supply device toward the power tool when the energy supply device and the power tool are connected to each other via the interface. In particular, the transmission of the electrical energy from the energy supply device to the power tool is enabled by an effective contact between the at least one female and the at least one male contact partner, wherein the effective contact in the context of the present invention is established or formed by at least two contact regions between the at least one female and the at least one male contact partner. By providing the at least two contact regions between the power contacts of the interface, the contact resistance between the at least one female and the at least one male contact partner can be significantly reduced. Advantageously, this can result in larger currents being able to be transmitted from the energy supply device to the power tool. Consequently, the interface can enable higher discharge currents of the interface, so that the energy supply device is quite particularly suitable for supplying energy to especially powerful power tools. Of course, the interface can also have more than two, i.e. for example three, four, five or more, contact regions between the contact partners.

In the context of the invention, it is preferred that the power contacts are designed as flat contacts. Thus, the interface comprises flat contacts which enable transmission of electrical energy from the energy supply device to the power tool with multiple contacts, i.e. with at least two contact regions. In this case, the multiple contacts preferably have differently oriented contact normal forces. As a result, the contact normal forces caused by the interface act not only in the clamping or plugging direction of the interface, but in different directions, so that a particularly robust interface can be provided. In addition, the provision of contact normal forces in different directions can prevent the contacts from "lifting", i.e. undesirably releasing from each other, under high accelerations. Tests have shown that the interface is optimally suited to resolve the trade-off between a desired low contact resistance, on the one hand, which is required to transfer high currents and amounts of energy between the power contacts, and a desired low plugging cycle wear, on the other. The interface can preferably be described as a flat contact system with at least one male and at least one female contact partner.

Furthermore, the provision of more than one contact region between the at least one female and the at least one male contact partner can ensure that the grade, quality and quantity of the transmission of electrical energy from the energy supply device to the power tool is less dependent on manufacturing tolerances and relaxation processes. Advantageously, the energy supply device is less susceptible and still able to ensure high discharge currents of the energy supply device even if manufacturing specifications are not exactly adhered to and minor mechanical deviations occur at the contact partners of the interface or a relaxation, especially due to a high thermal stress of the elastic spring-mounting regions, leads to a reduction of the contact normal force.

Another advantage of the invention is that relative distances between the contact partners can be significantly reduced by providing more than one contact region between power contacts of the interface. Such relative distances between the power contacts can lead to wear and poorer energy transfer from the energy supply device to the power tool, so that reducing the relative movements between the contact partners of the interface can make a significant contribution to keeping the current transfer capability of the interface at a high level, thus enabling the transfer of high discharge currents.

According to the invention, it is provided that the first contact region is definable by a first contact normal force and the second contact region is definable by a second contact normal force, wherein the first contact normal force and the second contact normal force have different orientations. In other words, the orientations or directions of the two contact normal forces do not coincide, but differ. It is preferred in the context of the invention that the orientations and/or directions of the first contact normal force and the second contact normal force do not coincide, but differ by an angular range Delta. The statement that "a contact region is definable by a contact normal force" or is defined, preferably means in the context of the invention that the corresponding contact normal force indicates or describes in which direction the contact partners act or press against each other in the corresponding contact region. For example, a first contact normal force of the first contact region of the interface may be defined by the legs of the female contact partner pressing against the blade of the male contact partner. In particular, this slight pressure is caused by the elastic, resilient material (for example, spring steel) of the female contact partner. In the first contact region, for example, the first contact normal force may be substantially perpendicular to a virtual axis through the blade of the male contact partner. In other words, a virtual axis, preferably extending centrally through the blade of the male contact partner, may be conceived to be substantially perpendicular, i.e., "normal" to the first contact normal force of the first contact region of the interface. Possible orientations of the contact normal forces of the different contact regions are shown, for example, in FIG. 4. FIG. 4 also shows an insertion direction in which the contact partners of the interface can be joined together. It is preferred in the context of the invention that a first contact normal force is oriented substantially perpendicular to this insertion direction, while a second contact normal force is oriented substantially parallel to the insertion direction. In this way, the first contact normal force and the second contact normal force are preferably substantially perpendicular to each other. Preferably, the insertion direction coincides with the virtual axis that can be mentally placed through the blade of the male contact partner.

In the context of the invention, it is preferred that the contact regions each comprise a plurality of contact points between the contact partners. In the context of the invention, this preferably means that the contact partners in the first and/or the second contact region can contact each other in one or more contact points in order to transmit electrical energy.

In a second contact region, for example, stops of the female contact partner can come into contact with each other against contact surfaces of the male contact partner so that electric current can flow via the contact surfaces. The second contact region can be described by a second contact normal force, which preferably indicates in which direction the involved components of the contact partners—in this case stops and contact surfaces—act or press on each other. In the context of the present invention, the second contact normal force may, for example, be substantially parallel to the insertion direction. It is thus preferred in the context of the invention that the first contact normal force and the second contact normal force have different orientations. In the previously described exemplary embodiment of the invention illustrated in FIG. 4, it is preferred in the context of the invention that the first contact normal force and the second contact normal force are oriented substantially perpendicular to each other. It has been shown that the stops of the female contact partner and contact surfaces of the male contact partner, which together form the second contact region, are particularly well suited for transferring high discharge currents from the energy supply device to the power tool because of the close contact between the contact partners, which can be further improved by a spring mounting of at least one of the contact partners, as will be discussed further below.

For example, the female contact partner may have stops that cooperate with contact or support surfaces of the male contact partner to create a particularly stable connection between the contact partners. If the female contact partner comprises exactly one stop, it is preferred in the context of the invention that this one stop is arranged in a symmetry plane of the female contact partner. If the female contact partner comprises two stops, it is preferred in the context of the invention that these two stops are present arranged as far apart as possible from each other in order to ensure improved support of the contact partners. The contact or support surfaces of the male contact partner may also have ramps to facilitate the establishment of the connection between the contact partners and to prevent mechanical damage to the contact partners.

The statement "substantially perpendicular" is not an unclear concept for a person skilled in the art, because a person skilled in the art knows that this statement includes not only those contact normal forces which are mathematically exactly perpendicular to one another, but also those contact normal forces which exhibit slight deviations from the mathematically exact normality. Such deviations can, for example, lie in a range of +/−10° or at +/−10% starting from a right angle (90°). It is preferred in the context of the invention that the first contact region is formed by at least one leg of the female contact partner and a blade of the male contact partner. It is preferred in the context of the invention that the female contact partner is formed as a receiving terminal, which preferably comprises two legs. The legs may, for example, be formed of a resilient, elastic material and may press against the blade of the male contact partner due to the elastic properties of the leg material. This contact between the at least one leg of the female contact partner and the blade of the male contact partner preferably forms the first contact region of the interface. It is very particularly preferred in the context of the invention that the first contact region is formed by the two legs of the female contact partner and a middle region of the blade of the male contact partner.

The first contact normal force and the second contact normal force have different orientations in the context of the present invention. In this context, an angle Delta between the contact normal forces may be about 90 degrees, i.e., the contact normal forces may form a substantially right angle. Such contact normal forces which are substantially perpendicular to each other are shown, for example, in FIGS. 4 to 6 or 9 (top). Here, the first contact normal force is preferably present in a first contact region and substantially perpendicular to the insertion direction of the energy supply device into the power tool, while the second contact normal force is present in a second contact region and substantially parallel to the insertion direction of the energy supply device into the power tool. The first contact normal force preferably has no force component in the insertion direction, while the second contact normal force acts substantially entirely in the insertion direction. It has been shown that the greatest possible second contact normal force in the insertion direction can advantageously lead to particularly good current conductivity of the interface and to a particularly stable connection between the contact partners.

Particularly in the case of multidimensional, dynamic loading of the contact system due to high accelerations during rough construction site operation, especially with impacting power tools, it is very advantageous if contact normal forces are available in different orientations. For example, as soon as high accelerations occur against the first contact normal force of a first orientation, there is a risk that this first contact region will be opened. If a contact subjected to a high current is opened, this can lead to sparking, which in turn can lead to very high wear of the local contact material, an increase in contact resistance, and thus a drastic reduction in contact life. Such an opening of the contact can also be referred to as a lifting of the contact, which can cause, for example, sparking or, in the worst case, burning of the contact. If contact normal forces are present in different orientations, the differently oriented second contact region can take over the current flow in case of the described lifting of the first contact region. As a result, the contact that lifts is not energized at all or at least only with a lower current, sparking can be avoided or reduced despite the lifting, and thus the contact experiences no damage or less damage and the service life is not impaired.

It has been found to be particularly advantageous if the angle of orientation of the contact normal forces is approximately 90 degrees, because this results in a very low acceleration for the second contact region in the case of an acceleration direction acting substantially against the first contact normal force.

Contacts of the first contact region are further subject to wear due to mating, which can damage the local contact materials and thus degrade contact resistance and impair contact life. Preferably, if a second contact force is oriented substantially perpendicular to the first contact normal force, it may act substantially in the insertion direction. Thus, the second contact region exhibits very low plugging wear because the second contact region is not loaded by relative movement during plugging.

It is preferred in the context of the invention that a second contact region is biased with an independent contact normal force. This means that in the event of damage, for example by fracture or relaxation, to the elastic element that biases the first contact region, there is still an independent elastic element that continues to bias the second contact region. Thus, a functional redundancy can be created, which ensures the functional reliability of the contact system, especially under high mechanical loads in harsh environmental conditions. It is preferred in the context of the invention that the biasing of the elastic means for reducing a relative distance between the contact partners acts in the insertion direction or against it. By contrast, the female contact partners are often formed as elastic bending contacts, wherein the elastic forces generated by the bending contacts are advantageously substantially perpendicular to the bias, which preferably acts in or against the insertion direction. This elastic spring mounting in two spatial directions can prevent the contacts from lifting and can ensure a particularly stable current flow, even under construction site conditions.

The energy supply device and the power tool can be connected to each other in such a way that a straight or a "slanted" stop is formed between the components of the interface. In the case of a straight stop, the second contact normal force is preferably formed in the second contact region in such a way that the second contact normal force is arranged substantially parallel to the insertion direction of the energy supply device (cf. FIG. 9 (top)). A slanted stop is preferably characterized in that an angle which is smaller than 90 degrees is formed between the first and the second contact normal force. If a slanted stop is formed between the components of the power tool, the second contact normal force can have a substantial force component which preferably acts in the insertion direction (cf. FIG. 9 (bottom)). Slanted stops can be achieved, for example, by chamfered contact surfaces.

In this case, it may be preferred in the context of the invention that the contact normal forces form an angle Delta with each other which is smaller than 90 degrees. It is preferred in the context of the invention that the angle Delta between the first contact normal force and the second contact normal force lies in an angular range of greater than 10 degrees, preferably greater than 45 degrees, and particularly preferably greater than 60 degrees. The angle Delta thus preferably lies in an angular range from 10 to 90 degrees, preferably in an angular range from 45 to 90 degrees, and particularly preferably in an angular range from 60 to 90 degrees. The position of the angle Delta can be seen from FIG. 10. Since the angle Delta lies in one of the stated angular ranges, the second contact normal force can have a substantial force component in the insertion direction.

The variant with slanted stop can preferably be used in such cases where centering of the plug on the blade is desired. The plug can thus be prevented from rotating as a result of accelerations. In this way, a detrimental relative movement can advantageously be reduced for both contact regions.

Many interfaces, as known from the prior art, only have a contact region for the transmission of electrical energy in which the occurring contact normal forces are normal, i.e. perpendicular, to the insertion direction. As a result, in such interfaces the contact normal forces do not have a significant force component in the insertion direction. By having different contact normal forces with different orientations and also contact normal forces or components of contact normal forces acting in the insertion direction in the context of the present invention, both the current transmission capability of the interface can be improved and a particularly robust and stable connection between the contact partners can be enabled.

It is preferred in the context of the invention that the interface comprises at least one elastic means for reducing a relative movement between the male contact partner and the female contact partner. In addition, it may be preferred that the elastic means for reducing the relative movement between the contact partners is configured to engage the at least one male contact partner and/or the at least one female contact partner. In a very particularly preferred exemplary embodiment of the invention, the elastic means for reducing the relative movement between the power contacts of the interface engages the female contact partner. Thus, in this exemplary embodiment of the invention, for example, the at least one female contact partner of the interface is present in a spring-mounted manner, wherein the at least one female contact partner is moreover preferably present at the energy supply device. The elastic means for reducing the relative movement is preferably also referred to as "elastic spring-mounting means" in the context of the invention. It is noted that the elastic means of the interface is an elastic means for spring mounting a male and/or female contact partner. Thus, the invention departs from the multitude of elastic means known from the prior art between the power tool and an interface region of the power tool. It has been shown that spring-mounting the contact partners of an interface in combination with differently oriented contact normal forces can significantly improve the current conductivity of the interface, as well as the robustness of the connection. This applies in particular if particularly large amounts of current or electrical energy are to be transmitted with the interface and if, in addition, the transmission of the electrical energy is to take place over a long time and/or under site conditions, i.e. sometimes with strong vibrations. These advantages result in particular from the elastic spring mounting of the contact partners in two spatial directions described above, which can be brought about by the at least one elastic means on the one hand and the design in particular of the female contact partners as bending contacts on the other.

It is preferred in the context of the invention that the at least one elastic means for reducing a relative movement between the contact partners is configured to generate a bias, wherein the bias is oriented substantially perpendicular to a first contact normal force. In this way, support of the bias with respect to the male contact partner, in particular with respect to its blade, can be provided via a material having good conductivity properties. Preferably, a one-piece contact can be formed as a result. Since the components of the female contact partner are preferably supported only on the blade of the male contact partner in the direction of the bias, the occurrence of relative movements between the at least one female contact partner and the at least one male contact partner is surprisingly effectively avoided. In other words, with the invention and the orientation of the bias substantially perpendicular to a first contact normal force, relative movements and the occurrence of friction and/or fretting corrosion (fretting) can be substantially reduced. Advantageously, in this way the plugging cycle wear caused in particular by the contact normal forces acting substantially perpendicular to the plugging direction of the contact partners of the interface can be substantially reduced, so that the service life of the contact partners of the interface can be significantly extended. In particular, the at least one elastic means pushes the female contact partner in the direction of the male contact partner, so that a particularly close mechanical contact is created between the female contact partner and the male contact partner. This close mechanical contact exhibits a particularly low contact resistance suitable for transmitting high discharge currents, wherein, surprisingly, low plugging cycle wear of the interface is observed at the same time.

In addition, tests have shown that the provision of the bias or the provision of the at least one elastic means with which the bias can be generated provides a particularly tolerance-independent interface for connecting an energy supply device to a power tool. The interface with the at least one biased or spring-mounted power contact in conjunction with the at least two contact regions between the power contacts has furthermore been found to have a markedly low relaxation and low plugging wear. The interface is therefore particularly robust in the face of high electrical and mechanical loads. It has a long service life and is also suitable for transferring surprisingly high discharge currents or large amounts of electrical charge per unit of time. Furthermore, the bias can be oriented substantially parallel to the second contact normal force.

The elastic means for reducing relative movement between the contact partners can engage one of the contact partners involved. In other words, the elastic means for reducing relative movement between the contact partners can engage the at least one male contact partner or the at least one female contact partner, wherein the contact partners form a form-fitting connection between the power tool and the energy supply device. In still other words, the elastic means can engage one of the contact partners, namely either the male contact partner or the female contact partner, to form a releasable connection between the power tool and the energy supply device. It is a key advantage of the invention that particularly large electrical currents can be transmitted by means of the form-fitting connection, and that surprisingly, the relative distances between the contact partners can be kept particularly short, if not quite reduced to a minimum. In this way, advantageously, the service life of the interface between the power tool and the energy supply device can be considerably extended. The female and male contact partners of the interface in the context of the invention may also preferably be described as "power contacts" of the interface.

By the provision of the at least one elastic means for reducing the relative movement, it is possible to easily compensate for vibrations and shocks acting on the contact partners, which may result in a relative movement and even an actual breaking of the contact connection between the storage battery and the power tool.

With the invention, in particular by the provision of the at least one elastic means for reducing a relative movement, a relative distance between the male and the female contact partner of the interface can be substantially reduced, so that mechanical friction losses and electrical current conduction losses between the contact partners can be reduced to a considerable extent. In particular, the invention can reduce a relative distance between the male and female contact partners of the interface to, for example, less than 0.3 mm, preferably less than 0.1 mm, and particularly preferably less than 0.05 mm.

The reduction of the relative movements or the shortening of the relative distances of the contact partners of the interface has several advantageous effects. A first effect relates to the relative movements or the relative distances between the contact partners that generate the form-fitting and/or frictionally engaged connection between power tool and energy supply device. These relative movements or the relative distances can undesirably increase the contact resistance of the interface, wherein said increase is initially independent of the state of wear of the interface. In the context of the invention, this preferably means that the increased contact resistances may arise even in the new state of a system composed of power tool and energy supply device if, in the interface between the system components, undesired relative movements of the contact partners of the interface occur. Furthermore, the relative movements between the contact partners can lead to wear and ultimately oxidation, such that the contact resistance of the interface can disadvantageously increase further. In particular, wear of the noble layers of the contact partners can occur, which ultimately leads to atmospheric oxidation involving atmospheric oxygen and/or to fretting corrosion. By virtue of the fact that the invention considerably reduces the relative movements between the contact partners and thus the contact resistance, it contributes significantly to achieving that particularly high electrical currents can be transmitted from the energy supply device to the power tool by means of the interface. The invention furthermore reduces undesired wear of the contact partners, and thus likewise makes a valuable contribution to extending the service life of the interface.

In the context of the invention, it is preferred that the elastic means for shortening the relative distances between the power contacts of the interface lead to a mechanical decoupling between the power tool and unit composed of male and female contact partners. Alternatively, the elastic means may lead to a mechanical decoupling between the power tool and the unit composed of male and female contact partners. Owing to the mechanical decoupling, any undesired relative movement between the contact partners is not transmitted, but is advantageously compensated by the elastic means.

Tests have shown that the invention can effectively prevent an undesirable increase in temperature in the contact region between the male contact partner and the female contact partner. For example, the temperature measured in the contact region between the contact partners can be reduced by up to 30 degrees because the grade and quality of the contact between the contact partners can be significantly improved with the invention, i.e., by providing the elastic means to reduce the relative movement. The improvement of the contact resistance advantageously leads to an increased current-carrying capacity of the interface, such that the invention allows operation of or electrical energy supply to power tools in higher power classes, i.e. particularly high-powered power tools. The reduction in power losses in the contact resistance may advantageously lead to a reduced thermal load on the surrounding components. In particular, components composed of thermoplastic material can thus be effectively protected from damage owing to excessive introduction of heat.

In the context of the invention, it is preferred that the contact partner on which the elastic means for reducing the relative movement acts is movably mounted. In other words, the contact partner with which the elastic means for reducing the relative movement is operatively connected, may be movably mounted. In the context of the invention, it is preferred that the movably mounted contact partner and/or the movably mounted receiving device is spring-mounted. If more than one contact partner is provided per connection partner of the interface, or if the power tool and/or the energy supply device have/has more than one receiving device, it may be preferred in the context of the invention that the movably mounted contact partners and/or the movably mounted receiving devices are spring-mounted. In this way, the relative movements between the contact partners, and the contact resistance, can be further considerably reduced, and the service life of the interface considerably extended. It may additionally be preferred that the elastic means for reducing the relative movement acts on a receiving device which will be described later. The receiving device may receive male and/or female power contacts, and may likewise be movably mounted. The receiving device is movably mounted in particular if it is operatively connected to the at least one elastic means for reducing the relative movement between the power contacts, or if said elastic means act on the receiving device. The statement that the at least one elastic means for reducing the relative movement between the contact partners is configured to act on the at least one male contact partner or on the at least one female contact partner preferably means, in the exemplary embodiment of the invention in which individual contact partners are arranged in a receiving device, means that the at least one elastic means for reducing the relative movement between the contact partners is configured to act on the receiving device in which individual contact partners are contained. The receiving device may form a contact block or contact means block which can be movably mounted or spring-mounted by the elastic means. In the context of the invention, it is preferred that the receiving device comprises the contact partners of a connection partner of the interface, i.e. power tool or energy supply device. However, in the context of the invention, it may also be preferred that several receiving devices are provided, which may each receive a sub-quantity of the contact partners of a connection partner. These several receiving devices may preferably also be spring-mounted by virtue of the elastic means for reducing the relative movement acting on these several receiving devices. Thus the receiving devices may comprise the power contacts, i.e. the female and male contact partners, and/or the communication elements. In the context of the invention, it is preferred that elastic means for reducing the relative movement are also described as "elastic spring-mounting means".

Preferably, the contact partner, on which the elastic means for reducing relative movement acts, is mounted so as to be movable relative to the power tool or relative to the energy supply device in the connected state. If the spring mounting is provided on the power tool side, i.e. the at least one elastic means acts on the contact partner or the receiving device of the power tool, the resulting spring mounting in the region of the power tool preferably contributes to achieving that the corresponding contact partner, when in the connected state, is mounted so as to be movable relative to the power tool. If the spring mounting is provided on the energy supply device side, i.e. the at least one elastic means acts on the contact partner or the receiving device of the energy supply device, the resulting spring mounting in the region of the energy supply device preferably contributes to achieving that the corresponding contact partner, when in the connected state, is mounted so as to be movable relative to the energy supply device.

The statement that the elastic means for reducing the relative movement between the contact partners is configured to act on the at least one male contact partner and/or on the at least one female contact partner firstly includes the possibility that the elastic means acts on one of the groups of contact partners, for example on all contact partners, which are arranged on the energy supply device, or on all contact partners which are arranged on the power tool. In the context of the invention, it may however also be preferred that both the power tool and the energy supply device comprise elastic spring-mounting means for the contact partners thereof. In this embodiment of the invention, the elastic means acts on the at least one male contact partner and on the at least one female contact partner. If one or both groups of contact partners is arranged in a receiving device, the elastic means may act on one of the receiving devices. If the contact partners both of the energy supply device and of the power tool have a receiving device, the elastic means may also act on both receiving devices. Action both on the contact partners of the power tool and on the contact partners of the energy supply device may be implemented for example by virtue of a hard spring being used in the case of one of the connection partners—energy supply device or power tool—and a soft(er) spring being used in the case of the other connection partner—power tool or energy supply device. The term “hard spring” is to be understood in the context of the invention as a spring with a high spring stiffness, while the term “soft spring” is to be understood in the context of the invention as a spring with a lower spring stiffness.

In the context of the invention, it is preferred that the at least one male contact partner is arranged on the power tool. The male contact partners may comprise blades which may be inserted in a female contact partner of the interface or other system component. According to an advantageous embodiment of the present invention, provision may be made for the male contact partners to be designed as pin-like plug connectors or blades, and the female contact partners of the interface as terminals with elastically deformable legs for receiving the pin-like plug connectors or blades. The male contact partner may be formed by a protruding region and a stop, wherein the protruding region, in a plugged state of the interface in which the energy supply device is connected to the power tool (therefore also: “in the connected state”), is introduced into one of the female contact partners. In an unconnected state, the power tool and the energy supply device may be independent and separate from one another. This may be the case for example when the energy supply device is being charged and is arranged in a charger in order to be charged. In the context of the invention, it may also be preferred that the at least one male contact partner is arranged on the energy supply device.

The energy supply device may preferably comprise at least one storage battery (accumulator), wherein the energy supply device is designed to supply the power tool with electrical energy. Electrical energy is output from the energy supply device to the power tool in particular in the connected state in which the power tool has been connected to the energy supply device via the interface. The female and male contact partners engage with one another when in the connected state, such that electrical current or electrical energy can flow between the contact partners via a contact region. Tests have shown that, by using the at least one elastic means for reducing a relative movement between the contact partners, said elastic means engaging one of the contact partners, significantly higher currents can be transmitted than with conventional contact systems as is the case from the prior art. For example, the invention allows the transmission of currents in a range in excess of 50 amperes, preferably in excess of 70 amperes, or particularly preferably in excess of 100 amperes.

The reason that higher electrical currents can flow from the energy supply device toward the power tool with the interface, which has at least one elastic means, is because the energy supply device is decoupled from the at least one contact pair of female and male contact partner. This decoupling will be described in greater detail below.

The at least one elastic means for reducing the relative movement can preferably comprise at least one elastic element, such as a spring. Here, the elastic element may be configured in the form of a spring, and in particular as a spiral, bending or coil spring. Alternatively, the elastic element may be configured as a component composed of an elastically deformable material. An elastomer is also a possible material in this case. It is thus possible to easily counteract a vibration-related movement of the connection element in multiple directions, i.e. not only in the direction toward or away from the connection element. In addition, the undesired relative movements between the contact partners of the interface can be effectively shortened through the use of an elastic element.

In the context of the invention, it is preferred that, on insertion into the female contact partner, the male contact partner compresses the least one elastic means such that the elastic means is brought into a stressed state. Alternatively or additionally, the at least one male contact partner may also be spring-mounted. In the context of the invention, the term “spring mounting” is to be understood to mean that the spring-mounted contact partner is operatively connected to the elastic means for reducing relative movements between the contact partners. In other words, the elastic means for reducing the relative movements between the contact partners can act on one of the contact partners, whereby advantageously a spring mounting of the corresponding contact partner is achieved. In the context of the invention, it is preferred that, when in the plugged state, in which the energy supply device and the power tool have been connected together, the at least one elastic means is in a stressed or tensioned state. In the context of the invention, it is preferred that the elastic means are biased even when in the uninstalled state, wherein a force flow within the energy supply device is closed by said elastic means. The at least one female contact partner may thereby be supported on the energy supply device. The stress of the at least one elastic means for reducing the relative movement between the contact partners, in particular when the contact system is in the connected state, causes the male and female contact partners to be pressed firmly against one another such that particularly good contact is formed between the contact partners. Owing to this “spring-mounted” contacting of the contact partners, or owing to the particularly close contact of the contact partners, the power density of the resulting contact can be considerably increased, such that it is made possible to transmit electrical currents in a range of more than 50 amperes, preferably more than 70 amperes, or particularly preferably more than 100 amperes. Also, the service life of the contact system can be substantially extended, such that the contact system is particularly suitable for energy supply devices with long service lives and/or high output currents, because the relatively high mechanical and/or electrical requirements on an interface can be optimally satisfied by means of the invention.

In the context of the invention, it is preferred that the at least one female contact partner is arranged on the energy supply device. The at least one female contact partner may preferably be formed by a receiving terminal which is designed to receive the blade of the male contact partner. For this, the female contact partner may have two legs composed of an elastic material, wherein the legs are pushed apart on insertion of the male contact partner such that the male contact partner comes to lie in an interior of the female contact partner or of the receiving terminal. In the context of the invention, this situation is referred to as the connected or plugged-together state of the interface. Owing to the elasticity of the material from which the legs of the female contact partner are formed, the legs of the receiving terminal of the female contact partner in this connected state press on the blade or the protruding region of the male contact partner, such that a contact region is created between the contact partners. Preferably, electrical current or electrical energy is exchanged between the contact partners via this contact region, such that current or electrical energy can flow from the energy supply device toward the power tool. In the context of the invention, it may also be preferred that the at least one female contact partner is arranged on the power tool.

The legs of the female contact partner may preferably comprise or be manufactured from spring steel. As well as spring steel, other metals, metal alloys or plastics with elastic properties may also be used to produce the female contact partners. Very particularly preferred may be materials having good conductivity, high yield strength and/or low relaxations, such as CuFe2P or CuCrSiTi.

In the context of the invention, it is preferred that the legs of the female contact partner or of the receiving terminal have a minimal spacing in the contact region so as to allow particularly good contact with the male contact partner. In the contact region with respect to the male contact partner, the female contact partner preferably has a taper that is defined by the minimal spacing between the legs of the female contact partner. In the context of the invention, it is preferred that the legs of the female contact partner comprise copper or are coated with a copper layer in the contact region or in the region of the taper or in the region of the minimal leg spacing. In addition, coatings comprising nickel and/or silver may be used without being limited thereto. By means of the coating material, which is preferably present in the contact region between male and female contact partners of the interface, the current flow or the flow of electrical energy from the energy supply device to the power tool can be further optimized, such that it is in particular also possible for high currents, for example 50 amperes, 70 amperes or 100 or more amperes, to flow through the interface.

By virtue of the fact that the energy supply device is releasably connected to the power tool by means of the interface, the respective electrical contacts of the power tool and of the energy supply device preferably bear against one another in a frictionally engaged fashion. Here, the female contact partner may comprise a preferably resiliently mounted clamp or receiving terminal, whilst the male contact partner may have an insert element that can be inserted into the clamp or the receiving terminal.

It is preferred in the context of the invention that the at least one elastic means for reducing the relative movement comprises at least one elastic element. Preferably, the male contact partner and the female contact partner can form a unit in the connected state, which is produced by inserting the male contact partner into the female contact partner. It is preferred in this embodiment of the invention that the elastic means for reducing the relative movement between the contact partners is operatively connected to the unit of female contact partner and male contact partner, i.e., engages the unit or one of the contact partners of the interface. In the connected state, the unit of male and female contact partner can be pushed toward the power tool or toward the energy supply device such that the energy supply device can move independently of the unit of male and female contact partner. This causes the vibration-sensitive unit of male and female contact partner unit to be decoupled from the energy supply device, wherein the decoupling of the unit and the energy supply device significantly improves the load-bearing capacity of the interface, its service life, and its robustness with respect to undesirable heating. Surprisingly, by providing the at least one elastic means for reducing the relative movement, the unit of male and female contact partner can be provided with a movement space, referred to as “play” in the context of the invention. Within this movement space, the unit can move without impacting on the boundary walls of the movement space. If the unit of male and female contact partner is mounted in a stationary manner to the power tool or to the energy supply device, the energy supply device can move around the unit independently of the unit, so that the movement of the energy supply device is decoupled from the unit of male and female contact partners, which is sensitive to contact and vibration.

Tests have shown that by providing the elastic means for reducing the relative movement at the interface, fretting corrosion (fretting) between the contact partners of the interface can be substantially reduced. In this way for example, either lower quality, cheaper coatings of the contact partners may be used, or the use of the at least one elastic means for reducing the relative movement leads to a longer service life of the interface and a higher power density, wherein the higher power density in the context of the invention preferably means that higher electrical currents can be transmitted through the interface of male and female contact partners.

The invention cannot prevent an undesired movement or oscillation of the energy supply device, but the at least one elastic means for reducing the relative movement advantageously ensures that the pairs of male and female contact partners of the energy supply device, which are susceptible to contact and vibration, are decoupled and thus protected from their movements and vibrations.

In the context of the invention, it is preferred that at least one male and one female contact partner in each case form a unit, wherein, in a connected state, this unit is decoupled from a movement of the energy supply device. Advantageously, this decoupling of the unit of male and female contact partners and the energy supply device is in particular achieved by the at least one elastic means for reducing the relative movement which acts on one of the contact partners or on the unit of at least one male and female contact partner. In other words, in the context of the invention, it is preferred that the elastic means are configured to reduce the relative movement between the contact partners and to act on one of the contact partners or on the unit of a male and a female contact partner. The decoupling of the unit from the energy supply device arises in particular if the at least one elastic means for reducing the relative paths between the contact partners is present on the energy supply device. In the context of the invention, however, it may also be preferred that the at least one elastic means for reducing the relative distances between the contact partners is present on the power tool. In this case, the unit of male and female contact partners may preferably be decoupled from the power tool.

It is preferred in the context of the invention that the interface comprises one to eight, preferably two to six, and most preferably four, female contact partners. Preferably, the interface has a corresponding number of male contact partners, so that in each case one male contact partner and one female contact partner can form a contact pair. In the context of the invention it is preferred that the male contact partners are arranged on the power tool, whereas the female contact partners are arranged on the energy supply device. Of course, it may also be preferred in the context of the invention that the male contact partners are arranged on the energy supply device, while the female contact partners are arranged on the power tool.

It is also preferred in the context of the invention if the interface comprises a receiving device for receiving at least one female contact partner and/or at least one male contact partner. In other words, the receiving device may be configured to receive at least one female contact partner or at least one male contact partner, or at least one female and at least one male contact partner. In a preferred exemplary embodiment of the invention, the receiving device may receive at least one female contact partner. In the context of the invention, it may be preferred that the female contact partners are arranged individually on the interface, or that they are part of a receiving device, wherein the individual female contact partners or the receiving device may be components of either the power tool or the energy supply device. In the context of the invention, it is most preferred that the individual female contact partners or the receiving device are/is part of the energy supply device.

The receiving device may form a compartment or a cassette in which female contact partners and/or male contact partners can be received. A contact block can advantageously be provided in this way, such that the female contact partners can move conjointly or be moved conjointly. The receiving device can preferably receive one to eight, preferably two to six, and most preferably four, female contact partners.

In the context of the invention, it is preferred that the contact partners of the interface are individually spring-mounted, or that a contact block formed by the contact partners is spring-mounted as a whole. If the contact partners are individually spring-mounted, the contact partners may be individually operatively connected to the elastic means for reducing the relative path. If the interface comprises for example four contact partners at one of the system elements, i.e. power tool or energy supply device, an elastic means or elastic element may be assigned to each of these four contact partners. Preferably, in this embodiment of the invention, this is referred to as "individual spring mounting of the power contacts of the interface". Alternatively, in the context of the invention, it may be preferred that an entire contact block, which preferably comprises several contact partners—female and/or male—is spring-mounted as a whole. Such a contact block in the context of the invention is also preferably described as a contact means block, wherein the contact means block may be formed by a receiving device with power contacts. It is preferred in the context of the invention that the contact block or receiving device is operatively connected to an elastic means or elastic element. This means preferably, in the context of the invention, that an elastic means or elastic element is assigned to the contact block or receiving device. Preferably, in this embodiment of the invention, this is referred to as a "spring-mounted receiving device" or a "spring-mounted contact means block". It is preferred in the context of the invention that the interface comprises communication elements for exchanging data between the power tool and the energy supply device. For example, the interface may comprise at least two communication elements, wherein a first communication element is arranged on the power tool and a second communication element is arranged on the energy supply device. The communication elements may be configured to establish a communication link between the power tool and the energy supply device, wherein the communication link may be wire-based or without wires. In other words, the communication link between the power tool and the energy supply device may be of wired or "wireless" design. For example, wireless communication between the power tool and the energy supply device may be based on Bluetooth, WLAN, Zigbee, radio, near-field communication, or the like. For example, transmitters and receivers can be provided as communication elements.

In a preferred exemplary embodiment of the invention, the interface comprises four power contacts and two communication elements. The power contacts and the communication elements may be arranged together in a receiving device, wherein an elastic spring-mounting means is associated with the common receiving device. However, it may also be preferred in the context of the invention that the power contacts are individually spring-mounted and the communication elements have their own communication receiving device. Individual spring mounting of the power contacts of the interface can be provided by the fact that elastic means are assigned to the movably mounted power contacts of the interface.

It may be preferred in the context of the invention for the communication elements to be integrated in the receiving device. In other words, the receiving device may comprise at least one communication element for transmitting data between the power tool and the energy supply device. In the context of the invention, the communication elements may preferably also be referred to as "communication plugs", in particular if the communication connection is of the wired type. In the context of the invention, it is very particularly preferred that the receiving device has two communication elements, wherein the communication elements can preferably be arranged centrally within the receiving device. For example, two female contact partners can be arranged on one side of the preferably centrally arranged two communication elements, and two female contact partners may likewise be present on the other side of the communication elements. The communication elements can, for example, be arranged one above the other.

In a preferred embodiment of the invention, the power contacts of the interface, i.e., the female and the male contact partners of the interface, can be individually spring-mounted, while a separate small receiving device is provided for the communication elements of the interface, thus forming a separate compartment or cassette for the communication elements. The receiving device for the communication elements can also be part of the interface between the power tool and the energy supply device.

It is preferred in the context of the invention that the at least one elastic means for reducing the relative movement is assigned to the receiving device, preferably as a whole. In this case, it is for example possible for a receiving device, which can receive four female contact partners, for example, to be connected by means of an elastic element to the corresponding system component—power tool or energy supply device. The decoupling then takes place for example between the energy supply device and/or the power tool on the one hand and the receiving device on the other hand, such that the female contact partners in the receiving device are decoupled or protected from the movements and/or vibrations of the energy supply device. However, it may also be preferred in the context of the invention that the decoupling takes place between the receiving device and the power tool, so that the interface may advantageously also be decoupled from the movements and/or vibrations of the power tool.

Tests have shown that the use of a compartment as receiving device for the female contact partners offers particularly good protection against tilt movements, and the friction moment between the contacts is reduced particularly well. This advantage of the invention may be achieved by virtue of support surfaces and the friction faces of the individual terminal contacts of the female contact partners being spaced far apart from one another laterally or substantially perpendicularly with respect to the insertion direction, and dynamic tilting moments thus being able to be particularly well absorbed owing to the large lever arm of the mounting. The same applies to the support surfaces of a contact block if the female contact partners are received by a receiving device. The statements above also apply analogously to male contact partners, in particular if they are received by a receiving device and form a contact block.

Alternatively, it may be preferred that the at least one elastic means for reducing the relative movement is assigned to a respective contact pair of female and male contact partners. In this case for example, each contact pair of female and male contact partners may have its own elastic means for reducing the relative movement, such as an elastic element, and may be decoupled or protected from the movements and/or vibrations of the energy supply device by means of the elastic means.

According to one exemplary embodiment of the invention, elastic means are disclosed which can counteract a relative movement between the energy supply device and the power tool. In this case, the energy supply device and power tool are releasably connected to each other via an interface, wherein the interface comprises male and female contact partners. In particular, the female contact partners may be in the form of individual contacts, wherein each female contact partner is configured to receive a male contact partner or blade thereof. Alternatively, the female contact partners may form a contact block ("receiving device" or "compartment") that may be part of the energy supply device or the power tool. In the context of the invention, it is particularly preferred that the female contact partners are arranged on the energy supply device. It may however also be preferred that the female contact partners are arranged on the power tool. Similarly, the male contact partners may be provided in the form of individual contacts, wherein in each case a male contact partner is configured to form a contact pair with a female contact partner having a contact region for the transmission of electrical energy. Alternatively, the male contact partners may form a contact block which may be part of the energy supply device or the power tool. In the context of the invention, it is particularly preferred that the male contact partners are arranged on the power tool. It may also be preferred, however, that the male contact partners are arranged on the energy supply device. The at least one elastic means for reducing the relative movement between the contact partners is preferably designed to prevent or reduce a relative movement between the contact partners of the interface or the power tool and the energy supply device. The at least one elastic means for reducing the relative movement can act here individually on the male and/or on the female contact partners of the interface. However, it may just as well be preferred in the context of the invention that the at least one elastic means for reducing the relative movement acts on the contact blocks or the receiving device for the female contact partners, which are formed by mostly two to eight contact partners. The individual female and/or male single contacts or the contact blocks formed from them can be arranged both on the power tool and on the energy supply device, wherein an arrangement of the female contact partners in the region of the energy supply device and an arrangement of the male contact partners in the region of the power tool is particularly preferred.

In a second aspect, the invention relates to an interface for transmission of electrical energy between a power tool and an energy supply device. The terms, definitions and technical advantages introduced for the system of power tool and energy supply device preferably apply to the interface in an analogous manner. The interface preferably has at least one male contact partner and at least one female contact partner and is characterized in that the female contact partner and the male contact partner are in contact with one another in at least a first contact region and in a second contact region, wherein the first contact region is definable by a first contact normal force and the second contact region is definable by a second contact normal force, wherein the first contact normal force and the second contact normal force have different orientations. In the context of the invention, it is preferred that a male and a female contact partner in each case form a unit, wherein the unit, in a connected state, is decoupled from a movement of the energy supply device.

In a further aspect, the invention relates to an energy supply device for use in the system. The energy supply device is preferably an energy supply device with a particularly long service life, and/or an energy supply device which is configured to output particularly high currents, in particular constant currents of more than 50 amperes, preferably more than 70 amperes, and most preferably more than 100 amperes.

The energy supply device may preferably be a storage battery or a preferably rechargeable battery. In the context of the invention, it is self-evidently also possible that the energy supply device has two or more storage batteries and/or batteries. The storage batteries and/or batteries may have so-called battery packs which, for example, comprise cylindrical cells. These cylindrical cells may for example contain a chemical substance comprising lithium ions, magnesium ions and/or sodium ions, without being restricted thereto. However, other cell types, for example with cuboid or cubic cells, may also be used in the context of the present invention.

The energy supply device is preferably an energy supply device with a particularly long service life, and/or an energy supply device which is configured to output particularly high currents, in particular constant currents of more than 50 amperes, preferably more than 70 amperes, and most preferably more than 100 amperes. The particularly long service life can preferably result in the energy supply device surviving a particularly large number of insertion processes or insertion cycles without wearing out. In addition, the particularly long service life can mean that the chemical components of the energy supply device are designed to be able to be charged more frequently than previous energy supply devices without significantly aging. A major advantage of the contact system consists in that such high-powered energy supply devices can be reliably and easily connected thereto. In particular, owing to the higher number of contact regions between the contact partners of the interface, the contact system is capable of transmitting high currents and, at the same time, of being used throughout the entire service life of the energy supply devices without sustaining wear. As a result, the advantages of new cell and battery technologies can be optimally utilized with the aid of the invention. With the invention, it is consequently possible to provide a system composed of power tool and energy supply device, which system allows efficient use of energy supply devices in battery-operated power tools, in particular also for applications and uses which impose very stringent electrical power requirements and/or very stringent service life requirements on the system or its interface.

In the context of the invention, it is preferred that the energy supply device comprises at least one energy storage cell ("cell"), wherein the at least one cell has an internal resistance DCR_I of less than 10 milliohms (mOhm). In preferred configurations of the invention, the internal resistance DCR_I of the at least one cell may be less than 8 milliohms and preferably less than 6 milliohms. Here, the internal resistance DCR_I is preferably measured in accordance with standard IEC61960. The internal resistance DCR_I represents, in particular, the resistance of a cell of the energy supply device, wherein any components or accessories of the cell do not make any contribution to the internal resistance DCR_I. A low internal resistance DCR_I is advantageous, as this means that unwanted heat that needs to be dissipated does not arise at all. The internal resistance DCR_I is, in particular, a DC resistance which can be measured in the interior of a cell of the energy supply device. The internal resistance DCR_I can of course also assume intermediate values such as 6.02 milliohms; 7.49 milliohms; 8.33 milliohms; 8.65 milliohms or 9.5 milliohms.

It has been found that, with the internal resistance DCR_I of the at least one cell of less than 10 milliohms, it is possible to provide an energy supply device which has particularly good thermal properties in the sense that it can be operated particularly well at low temperatures, wherein the cooling expenditure can be kept surprisingly low. In particular, an energy storage device with a cell internal resistance DCR_I of less than 10 milliohms is particularly well suited to supplying electrical energy to particularly powerful power tools. Such energy supply devices can therefore make a valuable contribution to allowing storage-battery-operated power tools to be used even in areas of application that those skilled in the art previously assumed were not open to storage-battery-operated power tools.

Advantageously, such an energy supply device can be used to allow a battery-operated or storage-battery-operated power tool having an energy supply device according to the invention to be supplied with a high level of output power over a long period of time without damaging the surrounding plastics components or the cell chemistry within the cells of the energy supply device.

It is preferred in the context of the invention that a ratio of a resistance of the at least one cell to a surface area A of the at least one cell is less than 0.2 milliohm/cm$^2$, preferably less than 0.1 milliohm/cm$^2$ and most preferably less than 0.05 milliohm/cm$^2$. In the case of a cylindrical cell, the surface of the cell can be formed, for example, by the outer surface of the cylinder as well as the top side and the bottom side of the cell. Furthermore, it can be preferred in the context of the invention for a ratio of a resistance of the at least one cell to a volume V of the at least one cell to be less than 0.4 milliohm/cm$^3$, preferably less than 0.3 milliohm/cm$^3$ and most preferably less than 0.2 milliohm/cm$^3$. For conventional geometric shapes, such as cuboids, cubes, spheres or the like, a person skilled in the art knows the formulae for calculating the surface or the volume of such a geometric body. In the context of the invention, the term "resistance" preferably denotes the internal resistance DCR_I which can preferably be measured in accordance with standard IEC61960. This is preferably a DC resistance.

It is preferred in the context of the invention for the at least one cell to have a heating coefficient of less than 1.0 W/(Ah·A), preferably less than 0.75 W/(Ah·A) and particularly preferably less than 0.5 W/(Ah·A). Furthermore, the at least one cell can be designed to output a current of greater than 1000 amperes/liter substantially constantly. The discharge current is indicated in relation to the volume of the at least one cell, wherein the volumetric measurement unit "liter" (I) is used as the unit for the volume. The cells according to the invention are therefore able to output a discharge current of substantially constantly greater than 1000 A per litre of cell volume. In other words, a cell with a volume of 1 liter is able to output a substantially constant discharge current of greater than 1000 A, wherein the at least one cell furthermore has a heating coefficient of less than 1.0 W/(Ah·A). In preferred configurations of the invention, the at least one cell of the energy supply device can have a heating coefficient of less than 0.75 W/(Ah·A), preferably less than 0.5 W/(Ah·A). The unit for the heating coefficient is watts/(ampere hours·amperes). The heating coefficient can of course also have intermediate values, such as 0.56 W/(Ah·A); 0.723 W/(Ah·A) or 0.925 W/(Ah·A).

The invention advantageously allows the provision of an energy supply device having at least one cell which has reduced heating and therefore is particularly well suited for supplying power tools in which high power outputs and high currents, preferably constant currents, are desired for operation. In particular, the invention can be used to provide an energy supply device for a power tool in which the heat which is optionally created during operation of the power tool and when outputting electrical energy to the power tool can be dissipated in a particularly simple and uncomplicated manner. Tests have shown that the invention can not only be used to more effectively dissipate existing heat. Rather, the invention prevents heat being generated or the quantity of heat generated during operation of the power tool can be considerably reduced using the invention. The invention can advantageously be used to provide an energy supply device which can supply electrical energy in an optimum manner primarily also to power tools which have stringent requirements in respect of power and discharge current. In other words, the invention can provide an energy supply device for particularly powerful power tools with which heavy drilling or demolition work can be performed on construction sites for example.

In the context of the invention, the term "power tool" should be understood to mean a typical piece of equipment that can be used on a construction site, for example a building construction site and/or a civil engineering construction site. It may be hammer drills, chisels, core drills, angle or cut-off grinders, cutting devices or the like, without being restricted thereto. In addition, auxiliary devices such as those occasionally used on construction sites, such as lamps, radios, vacuum cleaners, measuring devices, construction robots, wheelbarrows, transport devices, feed devices or other auxiliary devices can be "power tools" in the context of the invention. The power tool may be in particular a mobile power tool, wherein the energy supply device can also be used in particular in stationary power tools, such as column-guided drills or circular saws. However, preference is given to hand-held power tools that are in particular storage battery-operated or battery-operated.

It is preferred in the context of the invention that the at least one cell has a temperature cooling half-life of less than 12 minutes, preferably less than 10 minutes, particularly preferably less than 8 minutes. This preferably means in the context of the invention that, with free convection, a temperature of the at least one cell is halved in less than 12, 10 or 8 minutes. The temperature cooling half-life is preferably determined in an inoperative state of the energy supply device, that is to say when the energy supply device is not in operation, that is to say is present in a manner connected to a power tool. Energy supply devices with temperature cooling half-lives of less than 8 mins have primarily been found to be particularly suitable for use in powerful power tools. The temperature cooling half-life can of course also have a value of 8.5 minutes, 9 minutes 20 seconds or of 11 minutes 47 seconds.

Owing to the surprisingly low temperature cooling half-life of the energy supply device, the heat generated during operation of the power tool or when it is charging remains within the at least one cell only for a short time. In this way, the cell can be recharged particularly quickly and is rapidly available for re-use in the power tool. Moreover, the thermal loading on the components of the energy supply device or the power tool having the energy supply device can be considerably reduced. As a result, the energy supply device can be preserved and its service life extended.

It is preferred in the context of the invention that the at least one cell is arranged in a battery pack of the energy supply device. A series of individual cells can preferably be combined in the battery pack and in this way inserted into the energy supply device in an optimum manner. For example, 5, 6 or 10 cells may form a battery pack, wherein integer multiples of these numbers are also possible. For example, the energy supply device may have individual cell strings, which may comprise, for example, 5, 6 or 10 cells. An energy supply device having, for example, three strings of five cells each can comprise, for example, 15 individual cells.

In the context of the invention, it is preferred that the energy supply device has a capacity of at least 2.2 Ah, preferably at least 2.5 Ah. Tests have shown that the capacity values mentioned are particularly well suited to the use of high-powered power tools in the construction industry and satisfy the requirements there for the availability of electrical power and the possible service life of the power tool particularly well.

The at least one cell of the energy supply device is preferably configured to output a discharge current of at least 20 A for at least 10 s. For example, a cell of the energy supply device may be designed to provide a discharge current of at least 20 A, in particular at least 25 A, for at least 10 s. In other words, the at least one cell of an energy supply device can be configured to provide a continuous current of at least 20 A, in particular at least 25 A.

It is likewise conceivable that peak currents, in particular short-term peak currents, may lead to intense heating of the energy supply device. Therefore, an energy supply device with powerful cooling, as can be achieved by the measures described here, is particularly advantageous. It is conceivable, for example, that the at least one cell of the energy supply device can provide at least 50 A for 1 second. In other words, in the context of the invention, it is preferred for the at least one cell of the energy supply device to be configured to provide a discharge current of at least 50 A for at least 1 s. Power tools can often require high power outputs for a short period of time. An energy supply device of which the cells are capable of delivering such a peak current and/or such a continuous current may therefore be particularly suitable for powerful power tools such as those used on construction sites.

It is preferred in the context of the invention that the at least one cell comprises an electrolyte, wherein the electrolyte is preferably in a liquid state of aggregation at room temperature. The electrolyte can comprise lithium, sodium and/or magnesium, without be restricted thereto. In particular, the electrolyte can be lithium-based. As an alternative or in addition, said electrolyte can also be sodium-based. It is also conceivable for the storage battery to be magnesium-based. The electrolyte-based energy supply device can have a rated voltage of at least 10 V, preferably at least 18 V, in particular of at least 28 V, for example 36 V. A rated voltage in a range of from 18 to 22 V, in particular in a range of from 21 to 22 V, is very particularly preferred. The at least one cell of the energy supply device can have, for example, a voltage of 3.6 V, without being restricted thereto.

It is preferred in the context of the invention for the energy supply device to be charged, for example, at a charging rate of 1.5 C, preferably 2 C and most preferably 3 C. A charging rate of xC can be understood as meaning the current intensity which is required to fully charge a discharged energy supply device in a fraction of an hour corresponding to the numerical value x of the charging rate x C. For example, a charging rate of 3 C makes it possible to fully charge the storage battery within 20 minutes.

It is preferred in the context of the invention that the at least one cell of the energy supply device has a surface A and a volume V, wherein a ratio A/V of the surface to the volume is greater than six times, preferably eight times and more preferably ten times, the reciprocal of the cube root of the volume.

The expression that the surface area A of the at least one cell is greater than eight times the cube root of the square of the volume V can preferably also be expressed by the formula >8*ˆ(/). Written another way, this relationship can be described in that the ratio A/V of surface area to volume is greater than eight times the inverse of the cube root of the volume.

For checking whether the above relationship is fulfilled, values in the same base unit must always be used. If for example a value for the surface area in $m^2$ is used in the above formula, preferably a value in the unit $m^3$ is used for the volume. If for example a value for the surface area in the unit $cm^2$ is used in the above formula, preferably a value in the unit $cm^3$ is used for the volume. If for example a value for the surface area in the unit $mm^2$ is used in the above formula, preferably a value in the unit $mm^3$ is used for the volume.

Cell geometries which for example satisfy the relationship of A>8*ˆ(⅔) advantageously have a particularly favorable ratio between the outer surface area of the cell, which is critical for the cooling effect, and the cell volume. The inventors have found that the ratio of the surface area to the volume of the at least one cell of the energy supply device has an important influence on the removal of heat from the energy supply device. The improved cooling capacity of the energy supply device can advantageously be achieved by increasing the cell surface area for a constant volume and a low internal resistance of the at least one cell. It is preferred in the context of the invention for a low cell temperature given a simultaneously high power output to preferably be able to be rendered possible when the internal resistance of the cell is reduced. Reducing the internal resistance of the at least one cell can result in less heat being generated. In addition, a low cell temperature can be achieved by using cells in which the surface area A of at least one cell within the energy supply device is greater than six times, preferably eight times, and particularly preferably ten times, the cube root of the square of the volume V of the at least one cell. It is thus possible in particular for the release of heat to the surroundings to be improved.

It has been found that energy supply devices whose cells satisfy the stated relationship can be cooled significantly more effectively than previously known energy supply devices having, for example, cylindrical cells. The above relationship can be satisfied, for example, by virtue of the fact that, although the cells of the energy supply device have a cylindrical basic shape, additional elements that increase the surface area are arranged on the surface thereof. Said elements can be, for example, fins, teeth or the like. Cells which do not have a cylindrical basic shape, but rather are shaped entirely differently, can also be used within the scope of the invention. For example, the cells of the energy supply device can have a substantially cuboidal or cube-like basic shape. The term "substantially" is unclear to a person skilled in the art here because a person skilled in the art knows that, for example, a cuboid with indentations or rounded corners and/or edges should also be covered by the term "substantially cuboidal" in the context of the present invention.

It is preferred in the context of the invention for the at least one cell to have a cell core, wherein no point within the cell core is more than 5 mm away from a surface of the energy supply device. When the energy supply device is discharged, for example when it is connected to a power tool and work is performed with the power tool, heat can be produced in the cell core. In this specific configuration of the invention, this heat can be transported on comparatively short paths of travel as far as the surface of the cell of the energy supply device. The heat can be dissipated in an optimum manner from the surface. Therefore, such an energy supply device can exhibit good cooling, in particular comparatively good self-cooling. The time period until the limit temperature is reached can be extended and/or the situation of the temperature being reached can advantageously be entirely avoided. As a further advantage of the invention, a relatively homogeneous temperature distribution can be achieved within the cell core. This can result in uniform aging of the storage battery. This can in turn increase the service life of the energy supply device.

It is preferred in the context of the invention for the at least one cell to have a maximum constant current output of greater than 50 amperes, preferably greater than 70 amperes, most preferably greater than 100 amperes. The maximum constant current output is the quantity of current in a cell or an energy supply device that can be drawn without the cell or the energy supply device reaching an upper temperature limit. Possible upper temperature limits can lie in a region of 60° C. or 70° C., without being restricted thereto. The unit for the maximum constant current output is amperes.

All intermediate values should also always be considered to be disclosed in the case of all the value ranges that are mentioned in the context of the present invention. For example, values of between 50 and 70 A, that is to say 51, 62.3, 54, 65.55 or 57.06 amperes etc. for example, should also be considered to be disclosed in the case of the maximum constant current output. Furthermore, values of between 70 and 100 A, that is to say 72, 83.3, 96, 78.55 or 98.07 amperes for example, should also be considered to be disclosed.

It is preferred in the context of the invention for the energy supply device to have a discharge C rate of greater than $80 \cdot t\hat{}(-0.45)$, wherein the letter "t" stands for time in the unit seconds. The C rate advantageously allows quantification of the charging and discharge currents for energy supply devices, wherein the discharge C rate used here renders possible, in particular, the quantification of the discharge currents of energy supply devices. For example, the maximum permissible charging and discharge currents can be indicated by the C rate. These charging and discharge currents preferably depend on the rated capacity of the energy supply device. The unusually high discharge C rate of $80 \cdot t\hat{}(-0.45)$ advantageously means that the energy supply device can be used to achieve particularly high discharge currents which are required for operating powerful power tools in the construction industry. For example, the discharge currents can lie in a region of greater than 50 amperes, preferably greater than 70 amperes or even more preferably greater than 100 amperes.

In the context of the invention, it is preferred for the cell to have a cell temperature gradient of less than 10 kelvins. The cell temperature gradient is preferably a measure of temperature differences within the at least one cell of the energy supply device, wherein it is preferred in the context of the invention for the cell to have a temperature distribution that is as uniform as possible, that is to say for a temperature in an inner region of the cell to differ as little as possible from a temperature which is measured in the region of a lateral or outer surface of the cell.

BRIEF DESCRIPTION OF THE DRAWINGS

Further advantages will become apparent from the following description of the figures. The figures, the description and the claims contain numerous features in combination. A person skilled in the art will expediently also consider the features individually and combine them to form useful further combinations.

Identical and similar components are denoted by the same reference signs in the figures, in which:

FIGS. 5*a* and 5*b* show different views of a male and female contact partner in the connected state;

DETAILED DESCRIPTION

Figure 1:
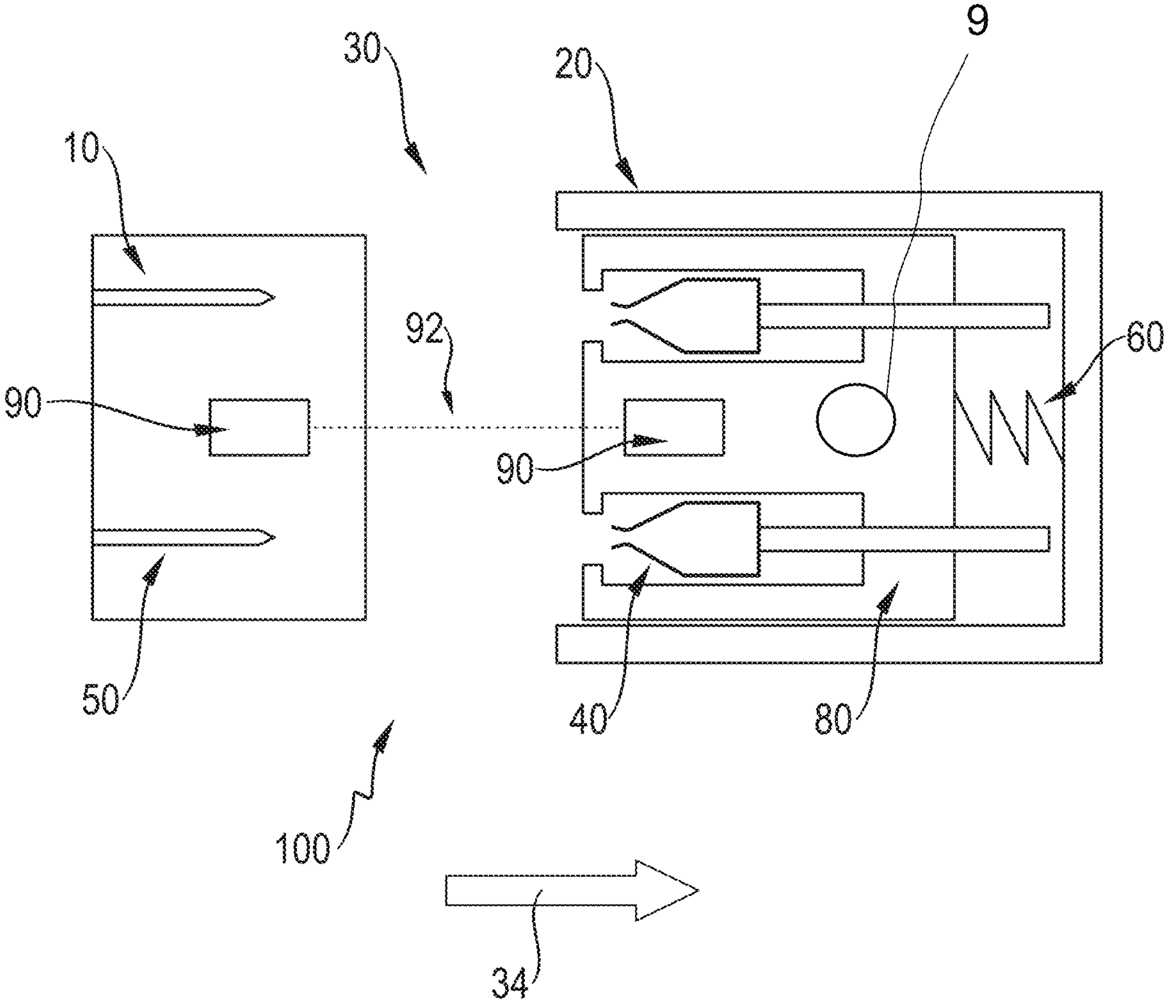
FIG. 1 shows a preferred embodiment of the system composed of power tool and energy supply device.
Figure 2:
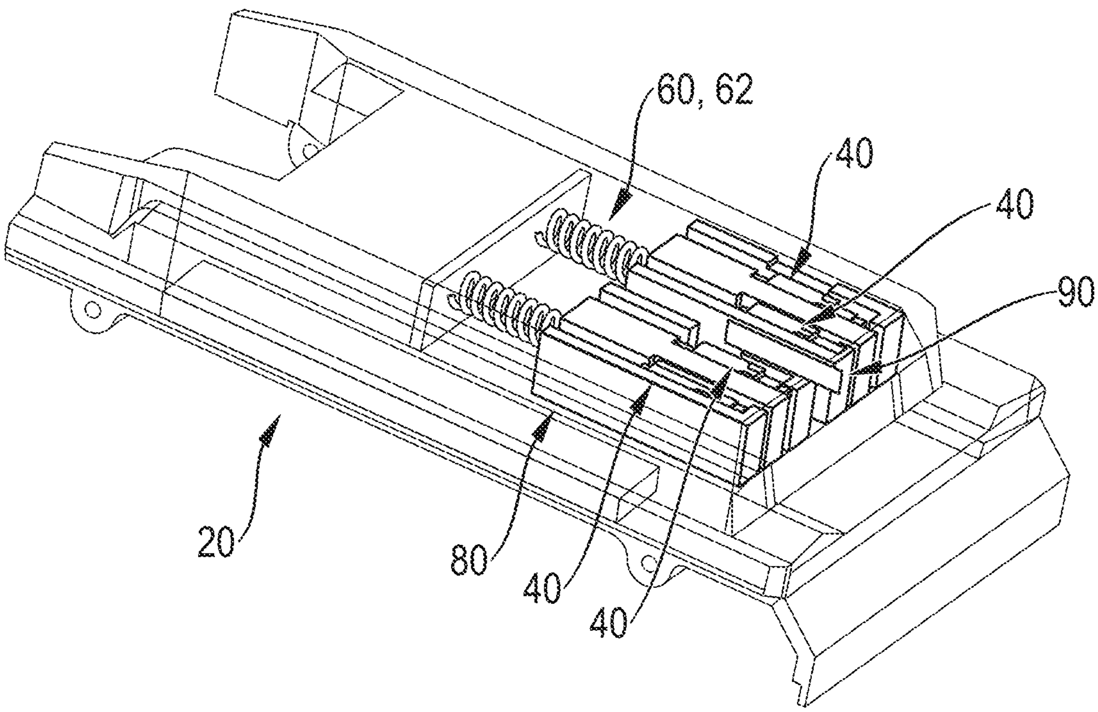
FIG. 2 shows a possible embodiment of the top side of an energy supply device of a preferred embodiment of the system.
Figure 3:
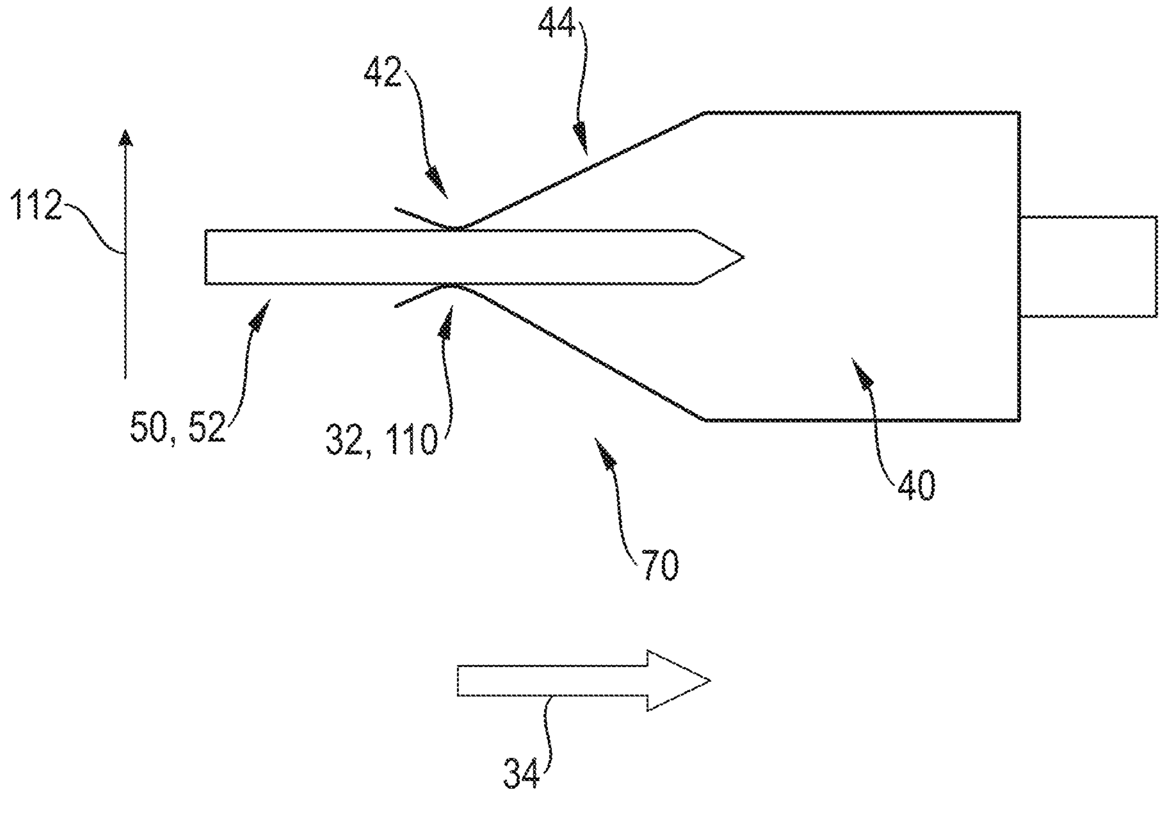
FIG. 3 shows a possible embodiment of a unit composed of female and male contact partners.

FIG. 1 shows a possible embodiment of the system 100 of power tool 10 and energy supply device 20 with a cell 9 shown solely schematically. In the exemplary embodiment of the invention shown in FIG. 1, the power tool 10 is illustrated in the left image half and the energy supply device 20 in the right image half. The power tool 10 has two male contact partners 50, wherein in particular the blades 52 are shown in FIG. 1. The male contact partners 50 are part of an interface 30, wherein the interface 30 in addition also has female contact partners 40. In the exemplary embodiment of the invention illustrated in FIG. 1, the female contact partners 40 are arranged on the energy supply device 20. The female contact partners 40 may constitute individual contacts, or as illustrated in FIGS. 1 and 2, be integrated in a block or compartment. The block or compartment with the female contact partners 40 is described as the receiving device 80 (see FIG. 2). FIG. 1 shows in particular the case in which the power tool 10 and the energy supply device 20 are separate from one another. The power tool 10 and the energy supply device 20 may together form a system 100, wherein the energy supply device 20 is configured to supply the power tool 10 with electrical energy. In addition, the interface 30 comprises an elastic means 60 for reducing the relative distance between the male contact partners 50 and the female contact partners 40. The at least one elastic means 60 may comprise an elastic element 62 which may for example be a spring or a spiral spring. However, all other conceivable elastic elements 62 are possible and conceivable. When the male contact partners 50 are introduced into the female receiving terminals 40, the elastic means 60 for reducing the relative distance are compressed so that a particularly stable contact is created between the contact partners 40, 50. Such a contact is shown in FIG. 3. By contact of the contact partners 40, 50 and compression of the elastic means 60 for reducing a relative distance, a play or movement space results in which a unit 70 (see FIG. 3) of a male contact partner 50 and a female contact partner 40 may be present. A movement or vibration of the energy supply device 20 then leads to the unit 70 of male contact partner 50 and female contact partner 40 having sufficient play not to impact on the boundary walls of the movement space. Thus the energy supply device 20 is decoupled from the unit 70 of male contact partner 50 and female contact partner 40, whereby the unit 70 of male contact partner 50 and female contact partner 40 is particularly well protected. The stable contact between the contact partners 40, 50 means that particularly high currents can flow from the energy supply device 20 to the power tool 10. This is achieved in particular because the contact resistance between the contact partners 40, 50 can be substantially reduced with the invention, so that in particular also the temperatures measured in a contact region 32 (see FIG. 3) between the contact partners 40, 50 rise less greatly than in conventional interfaces as known from the prior art. Because of the reduced contact resistance and reduced temperatures in the contact region 32 of the interface 30, gratifyingly, the service life of the interface 30 is extended.

Although FIG. 1 shows that the male contact partners 50 are arranged on the power tool 10, and the female contact partners 40 on the energy supply device 20, a reversed arrangement may also be possible in which the male contact partners 50 are arranged on the energy supply device 20 and the female contact partners 40 on the power tool 10. In particular, in the context of the invention, it may also be preferred that the male contact partners 50 are spring-mounted, i.e. are connected to an elastic means 60 for reducing a relative distance.

An insertion direction 34 is shown in the figures, indicating the direction in which the contact partners 40, 50 of the interface 30 can be plugged or pushed into each other to form an electrically conductive connection.

FIG. 2 shows a possible embodiment of the top side of an energy supply device 20 of a preferred embodiment of the system 100. The figure shows four female contact partners 40 which are arranged in a receiving device 80. In an exemplary embodiment of the invention which is not shown, the receiving device 80 may also receive male contact partners 50, or male contact partners 50 and female contact partners 40. The receiving device 80 is in particular configured to receive the power or current contacts 40, 50 of the interface 30 (see, e.g, FIG. 1).

The interface 30 may include communication elements 90 that may, for example, be disposed in the region of the receiving device 80 or may be a component of the receiving device 80. The communication elements 90 can be arranged in the middle or centrally in the receiving device 80 and can be provided for transmitting data between the power tool 10 and the energy supply device 20. Furthermore, FIG. 2 shows two elastic elements 62, which are formed as springs, in particular spiral springs. The springs 62 form means 60 for reducing a relative distance between the current or power contacts 40, 50 of the interface 30. The communication elements 90 can be designed to establish a communication link 92 between the power tool 10 and the energy supply device 20, wherein the communication link 92 can be of wired or wireless design. The communication link 92 is schematically shown in FIG. 1 by the dashed line between the communication elements 90.

The receiving device 80 can further comprise communication elements 90, which are preferably arranged in the middle or centrally in the receiving device 80. The communication elements 90 are preferably provided for transmitting data between the power tool 10 and the energy supply device 20. Furthermore, FIG. 2 shows two elastic elements 62, which are formed as springs, in particular spiral springs. The springs 62 form means 60 for reducing a relative distance.

FIG. 3 shows a further possible embodiment of a unit 70 of a female contact partner 40 and a male contact partner 50. FIG. 3 in particular shows an interface 30 which has a female contact partner 40 and a male contact partner 50. In particular, FIG. 3 shows a connected state in which the energy supply device 20 and the power tool 10 have been connected together such that current or electrical energy can flow from the energy supply device 20 toward the power tool 10. The blade 52 of the male contact partner 50 is arranged in the receiving terminal 44 or legs 44 of the female contact partner 40, wherein the contact partners 40, 50 together form a contact region 32 via which the current or electrical energy can be transmitted from the energy supply device 20 to the power tool 10. The contact region 32 is formed in particular in the region of a taper 42 of the female contact partner 40, in which the legs 44 or the components of the receiving terminal 44 of the female contact partner 40 adopt a minimum distance from one another. Thus the legs 44 of the female contact partner 40 lie particularly closely against the blade 52 of the male contact partner 50. The contact region 32 preferably represents a first contact region 110 in the context of the present invention. A first contact normal force 112 is oriented substantially perpendicular to the insertion direction 34 in the first contact region 110 of the interface 30.

Figure 4:
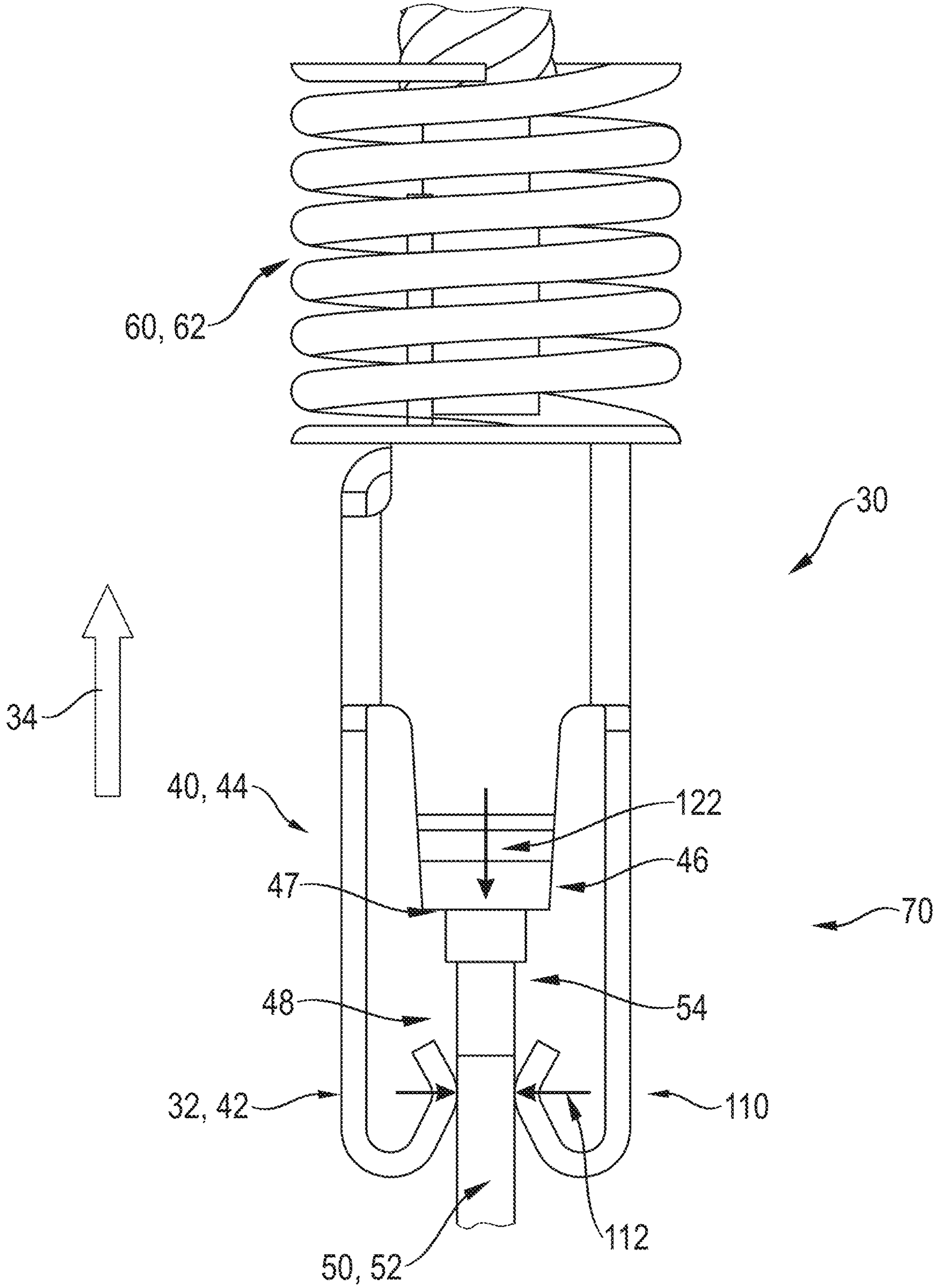
FIG. 4 shows a possible embodiment of an interface composed of a female and a male contact partner with two contact regions.

FIG. 4 shows a further possible embodiment of a unit 70 of a female contact partner 40 and a male contact partner 50. FIG. 4 shows in particular an interface 30 comprising power contacts 40, 50, wherein the at least one female contact partner 40 is spring-mounted or biased with an elastic means 60 for reducing the relative distance between the contact partners 40, 50. The blade 52 of the male contact partner 50 is received by an interior 48 of the female contact partner 40, wherein this interior 48 is formed by the legs 44 of the female contact partner 40. The contact between the contact partners 40, 50 is present in particular in a contact region 32 of the interface 30 which, in the exemplary embodiment of the invention illustrated in FIG. 4, is arranged in the region of the smallest distance between the legs 44 of the female contact partner 40. This contact region 32 is preferably also referred to in the context of the invention as the first contact region 110. The first contact normal force 112 is shown in FIG. 4 with the arrows pointing towards each other. The first contact normal force 112 is preferably substantially perpendicular to a virtual central axis through the blade 52 of the male contact partner 50. The first contact normal force 112 may additionally be formed substantially perpendicular to the second contact normal force 122 defined by a second contact region 120 of the interface 30. In the exemplary embodiment of the invention illustrated in FIG. 4, the first contact normal force 112 is oriented substantially perpendicular to the insertion direction 34 of the interface 30, while the second contact normal force 122 is oriented substantially parallel to the insertion direction 34 of the interface 30.

The second contact region 120 may be formed by stops 49 of the female contact partner 40 and contact surfaces 56 of the male contact partner 50. Preferably, the second contact region 120 between the contact partners 40, 50 is formed by contact surfaces 49, 56, wherein the female contact partner 40 has a contact surface 49 and the male contact partner 50 has a contact surface 56. In the connected state of the contact partners 40, 50 shown in FIGS. 5*a* and 5*b*, the contact surfaces 49, 56 of the contact partners 40, 50 are oriented substantially perpendicularly with respect to the insertion direction 34. The contact surfaces 49, 56 may be described by a surface normal, wherein the surface normal is oriented substantially parallel to the insertion direction 34 in the exemplary embodiment of the invention shown in FIGS. 5*a* and 5*b*. A second contact normal force 122 acts between the contact surfaces 49, 56 of the contact partners 40, 50 and is preferably oriented substantially parallel to the insertion direction 34. The direction in which the second contact normal force 122 acts is indicated by a black arrow in FIG. 5*a*. Preferably, the second contact normal force 122 is oriented substantially perpendicular to the first contact normal force 112. Electrical current can be transmitted from one contact partner 40, 50 to the other contact partner 50, 40 in both the first contact region 110 and the second contact region 120 of the interface 30. Tests have shown that the transmission of the electrical current is particularly loss-free, which is due to the close contact between the one contact partners 40, 50 of the interface 30. The transmission of the electric current can be further improved if at least one of the contact partners 40, 50 of the current conductor pair 70 or the pair 70 of power contacts 40, 50 is spring-mounted.

In the exemplary embodiment of the invention shown in FIGS. 5*a*, 5*b*, 6*a* and 6*b*, the female contact partner 40 has two stops 49. It is preferred in the context of the invention that these two stops 49 are spaced as far apart as possible, because this improves the mechanical stability of the interface 30. In particular, the greatest possible distance between the stops 49 of the female contact partner 40 effectively protects against undesirable tilting of the interface 30, which could impair the current-carrying capacity of the interface 30. The blade 52 of the male contact partner 50 projects into an interior 48 of the female contact partner 40, but does not abut anywhere therein. The pointed or wedge-shaped configuration of the front region 54 of the blade 52 of the male contact partner 50 is preferably intended to push apart the contact legs 44 of the female contact partner 40 in such a way that the blade 52 of the male contact partner 50 can slide into the interior 48 of the female contact partner 40 with minimal complication. The contact surface 47 of the female contact partner 40 is preferably designed to provide a relative distance between the contact partners 40, 50 of the interface 30.

FIGS. 5*a* and 5*b* show different views of a male contact partner 50 and a female contact partner 40 in the connected state. FIG. 5*a* shows a side view of the unit 70 of female contact partner 40 and male contact partner 50, while part FIG. 5*b* shows a top view of the unit 70 of female contact partner 40 and male contact partner 50. The female contact partner 40 may be present connected to a current conductor 36, wherein the current conductor 36 may be connected to, for example, energy storage cells of the energy supply device 20 to conduct electrical current or energy towards the interface 30. The current conductor 36 may be formed, for example, by a braided wire. The male contact partner 50 may preferably be arranged on a power tool 10 or may be part of a power tool 10. In particular, the male contact partner 50 may be designed to receive the electric current or energy via its blade 52 when the male contact partner 50 and the female contact partner 40 are connected to each other, as shown in FIGS. 5*a* and 5*b*. The blade 52 of the male contact partner 50 may then be present received in an interior 48 of the female contact partner 40 and may be present in contact with components of the female contact partner 40 at two locations 110, 120. In the context of the invention, these contact locations 110, 120 are referred to as the first contact region 110 and the second contact region 120. The first contact region 110 is present in the region of a taper 42 of the legs 44 of the female contact partner 40. In the region of this taper 42, the legs 44 of the female contact partner 40 are pressed onto the blade 52 of the male contact partner 50 so that a first contact normal force 112 can act between the contact partners 40, 50. This first contact normal force 112 is preferably oriented substantially perpendicular to an insertion direction 34 of the contact partners 40, 50 relative to each other. The direction in which the first contact normal force 112 acts is indicated by a black arrow in FIG. 5*a*. The insertion direction 34 preferably corresponds to the direction in which the blades 52 of the male contact partners 50 can be introduced into the contact arms 44 of the female contact partners 40 in order to connect the contact partners 40, 50 of the interface 30. FIGS. 5*a*, 5*b*, 6*a* and 6*b* each show a pair 70 of a male contact partner 50 and a female contact partner 40. It is preferred in the context of the invention that the interface 30, or its connecting partners 10, 20, comprises more than one contact pair 70. For example, the power tool 10 and/or the energy supply device 20 may each comprise four contact partners 40, 50. Furthermore, these contact partners 40, 50 may be present arranged in receiving devices 80 (cf. FIG. 1).

In the exemplary embodiment of the invention shown in FIGS. 5*a* and 5*b*, the one female contact partner 40 is spring-mounted. This means that the female contact partner 40 is connected to an elastic spring-mounting means 60, which can be, for example, a spring 62 or another elastic means 62. In the connected state of the contact partners 40, 50 shown in FIGS. 5*a* and 5*b*, the elastic spring-mounting means 60 is present compressed or pressed together. As a result, a bias is exerted on the unit 70 of the contact partners 40, 50, which leads to a decoupling of this unit 70. FIG. 5 thus shows a single-spring-mounted female contact partner 40.

The female contact partner 40 can further comprise a stop 49 that can cooperate with a contact surface 56 of the male contact partner 50. This can increase the stability of the connection between the contact partners 40, 50. In the side view of the contact partner pair 70 shown in FIG. 5*a*, two stops 49 of the female contact partner 40 are shown, wherein a first or upper stop 49 is arranged on the upper side of the female contact partner 40 and a second or lower stop 49 is arranged on the lower side of the female contact partner 40. If the female contact partner 40 has two stops 49, it is preferred in the context of the invention that these stops 49 are spaced as far apart as possible. By providing the stops 49 which cooperate with the contact surface 56 of the male contact partner 50, tilting of the contact partners 40, 50 relative to each other can be effectively prevented. As can be seen from FIG. 6*a*, the contact surface 56 can have ramps 59 for guiding the stops 49 in order to guide the contact partners 40, 50 towards each other when the connection between the contact partners 40, 50 is made, in such a way that no damage occurs to the contact partners 40, 50.

Figure 6A:
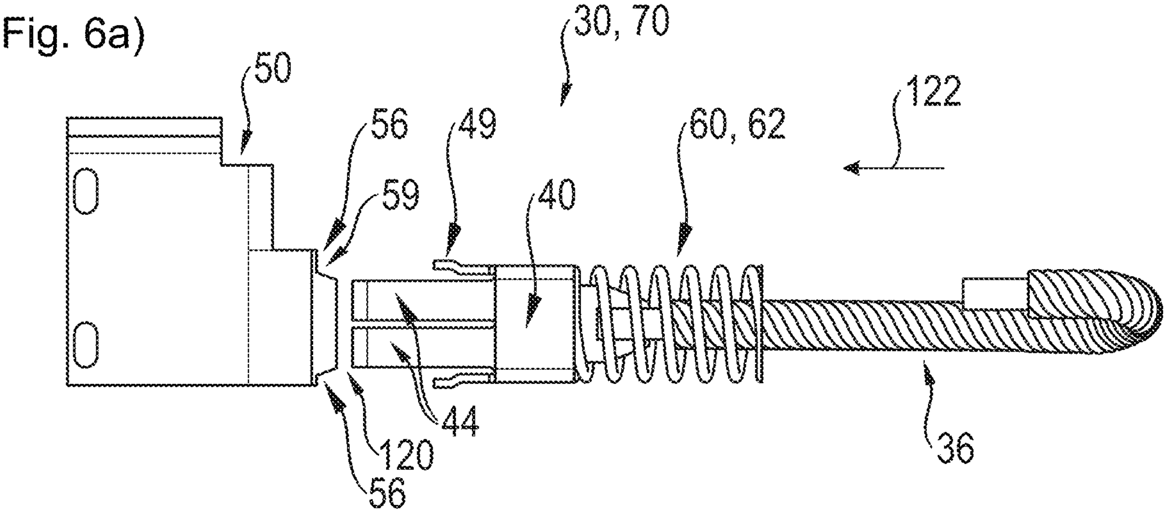
FIGS. 6*a* and 6*b* show different views of a male and female contact partner in the separated state.
Figure 6B:
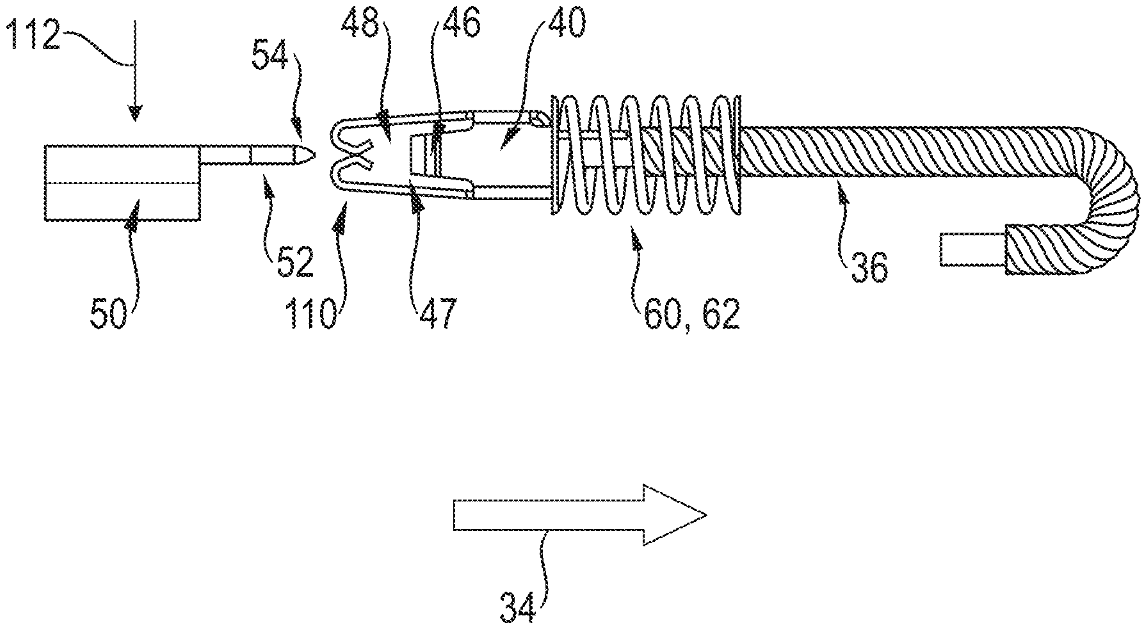

FIGS. 6*a* and 6*b* show different views of a male contact partner 50 and a female contact partner 40 in a separated state, i.e. the contact partners 40, 50 are not connected to each other but are present separately. Part FIG. 6*a* shows a side view of the unit 70 of female contact partner 40 and male contact partner 50, while part FIG. 6*b* shows a top view of the unit 70 of female contact partner 40 and male contact partner 50. The male contact partner 50 is shown on the left side of FIGS. 6 and 6*b*, while the female contact partner 40 is shown on the right side of FIGS. 6 and 6*b*. The male contact partner 50 comprises a blade 52 for insertion into the female contact partner 40, as well as a contact surface 56 with ramps 59. The blade 52 of the male contact partner 50 and the contact legs 44 of the female contact partner 40 preferably form the first contact region 110 in the context of the invention, while the stops 49 of the female contact partner 40 and the contact surfaces 56 of the male contact partner 50 form the second contact region 120. A second contact normal force 122 acts in the second contact region 120 and is preferably oriented substantially parallel to an insertion direction 34 of the interface 30. The direction in which the second contact normal force 122 acts is indicated by a black arrow in FIG. 6*a* 6*b*). It is preferred in the context of the invention that the stops 49 and contact surfaces 56, in particular the surfaces constituting them, are oriented substantially perpendicular to the insertion direction 34 of the interface 30. In other words, a surface normal of the contact surfaces 49, 56 can be defined which is oriented substantially parallel to the insertion direction 34, wherein the surface normal is oriented substantially perpendicular to the contact surfaces 49, 56.

A first contact region 110 may be formed by the contact arms 44 of the female contact partner 40 and the blade 52 of the male contact partner 50. A first contact normal force 122, which is preferably oriented substantially perpendicular to an insertion direction 34 of the interface 30, acts in this first contact region 110. The direction in which the first contact normal force 112 acts is indicated with a black arrow in FIG. 6*b*.

Figure 7:
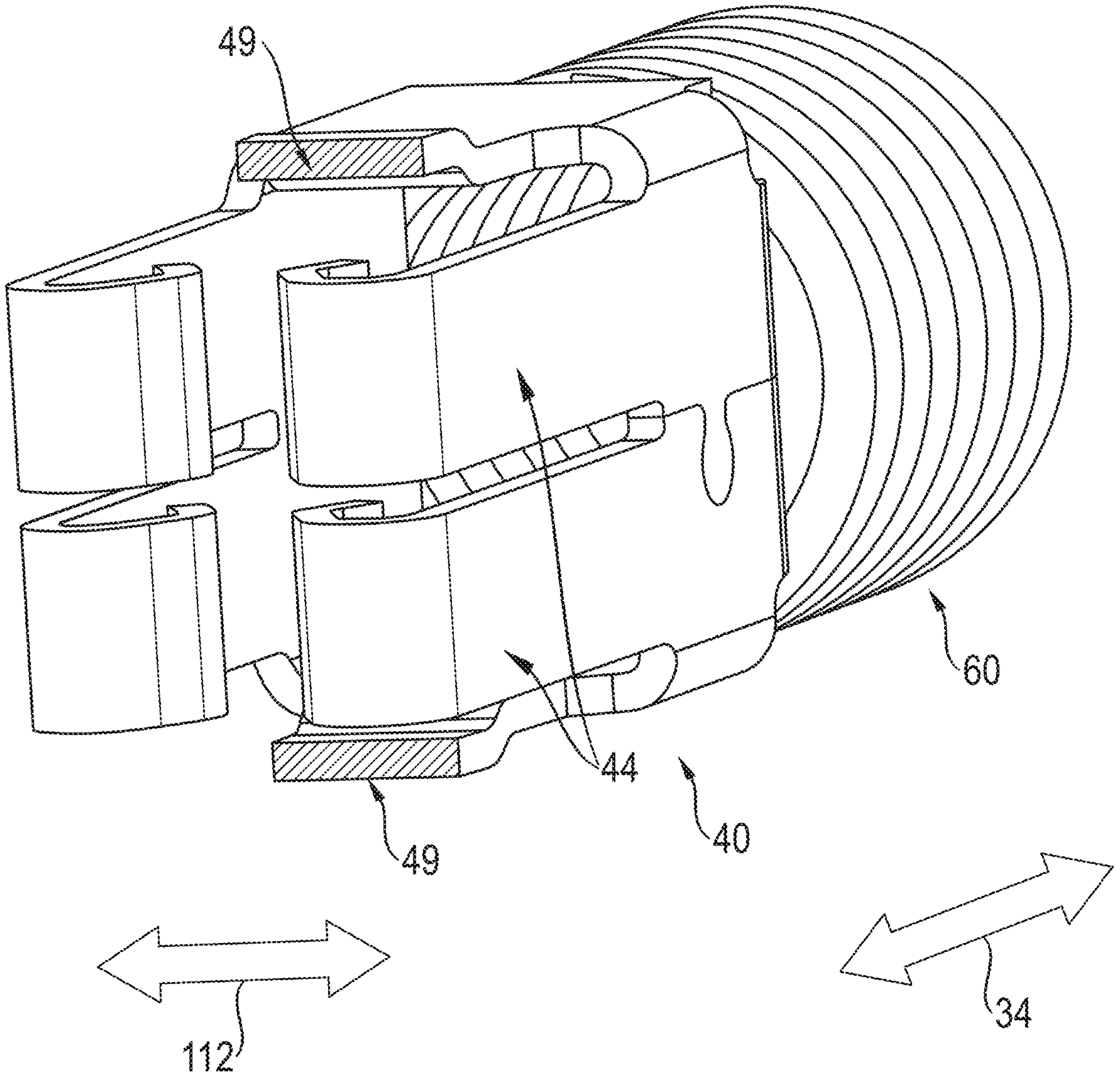
FIG. 7 shows a detailed view of a preferred embodiment of a female contact partner.

In the exemplary embodiment of the invention shown in FIGS. 6 and 6*b*, the female contact partner 40 is present in a spring-mounted state, i.e., the female contact partner 40 is connected to an elastic means 60 which is present in a relaxed state in FIG. 6, i.e., the spring 62 or the elastic means 62 of the elastic spring-mounting means 60 is present in a non-compressed state. The female contact partner 40 shown in FIG. 6 may be a component of an energy supply device 20, wherein the female contact partner 40 may be connected to other components of the energy supply device 20 via a current conductor 36. The current conductor 36 may be formed as a braided wire and/or may comprise such a wire FIG. 7 shows a detailed view of a preferred embodiment of a female contact partner 40. The embodiment of the female contact partner 40 shown in FIG. 7 has two contact arms 44 on each side, into which a blade 52 of a male contact partner 50 (not shown in FIG. 7) can be inserted. The blade 52 of the male contact partner 50 and the contact arms 44 of the female contact partner 40 may form a first contact region 110 of the interface 30. The female contact partner 40 shown in FIG. 7 is connected to an elastic spring-mounting element 60, so that the female contact partner 50 is preferably spring-mounted. In particular, FIG. 7 shows the stops 49 which can form a second contact region 120 of the interface 30 with contact surfaces 56 of the male contact partner 50. Electrical current can flow through the contact regions 110, 120 of the interface 30 and thus electrical energy can be transferred from one contact partner 40, 50 to the other contact partner 50, 40. The current-carrying regions of the contact region 110, 120 of the interface 30 are shown in particular in FIG. 8. The stops 49 are spaced as far apart as possible in order to allow the most stable mechanical connection possible between the contact partners 40, 50. In particular, the distance is substantially perpendicular to the direction of the first contact normal force 112, as well as substantially perpendicular to the insertion direction 34 of the interface 30. The greatest possible distance between the stops 49 ensures in particular that the interface 30 is particularly well protected against tilting movements.

Figure 8:
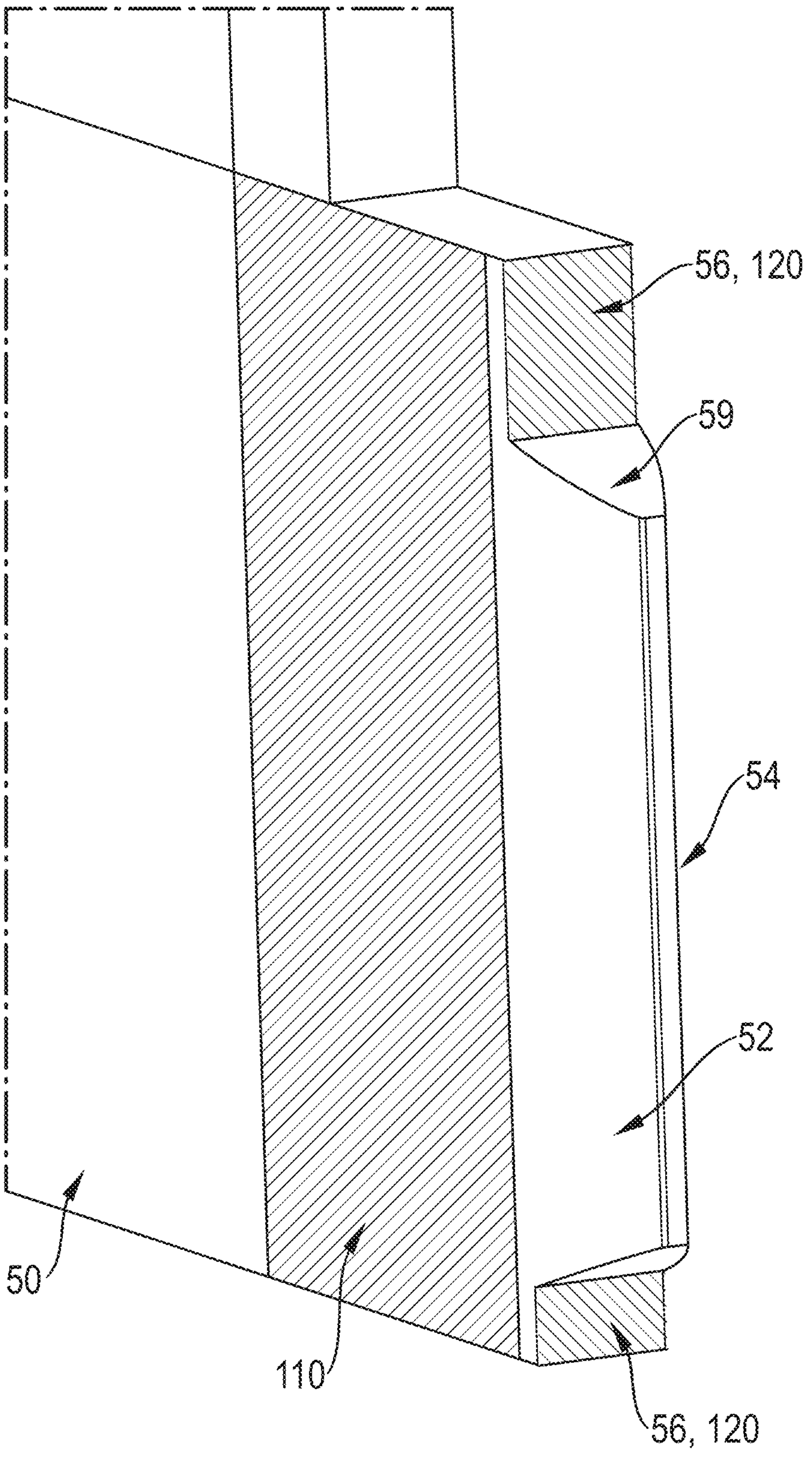
FIG. 8 shows a detailed view of a preferred embodiment of a male contact partner.

FIG. 8 shows a detailed view of a preferred embodiment of a male contact partner 50. The male contact partner 50 shown in FIG. 8 comprises a blade 52 having a front region 54, and an upper and a lower contact surface 56. The contact surfaces 56 may cooperate with stops 49 of the female contact partner 40 (not shown in FIG. 8) and may form a second contact region 120. The blade 52 of the male contact partner 50 protrudes into an interior 48 of the female contact partner 40 when the interface 30 is in the connected state, without being in contact with any component of the female contact partner 40. The front region 54 of the blade 52 of the male contact partner 50 is preferably tapered or wedge-shaped in order to, when the contact partners 40, 50 are connected, widen the contact arms 44 of the female contact partner 40 in such a way that the blade 52 can be inserted particularly easily into an interior 48 of the female contact partner 40.

The hatched region of the blade 52 of the male contact partner 50 shown in FIG. 8 is "clasped" by the contact arms 44 of the female contact partner 40 when the interface 30 is connected, forming a first contact region 110 between the contact partners 40, 50. It is preferred in the context of the invention that electrical current can flow through both contact regions 110, 120, wherein these regions passed through by current are shown hatched in FIG. 8.

The male contact partner 50 may also include ramps 59 to help guide the stops 49 of the female contact partner 40 and the contact surfaces 56 of the male contact partner 50 toward each other.

Figure 9:
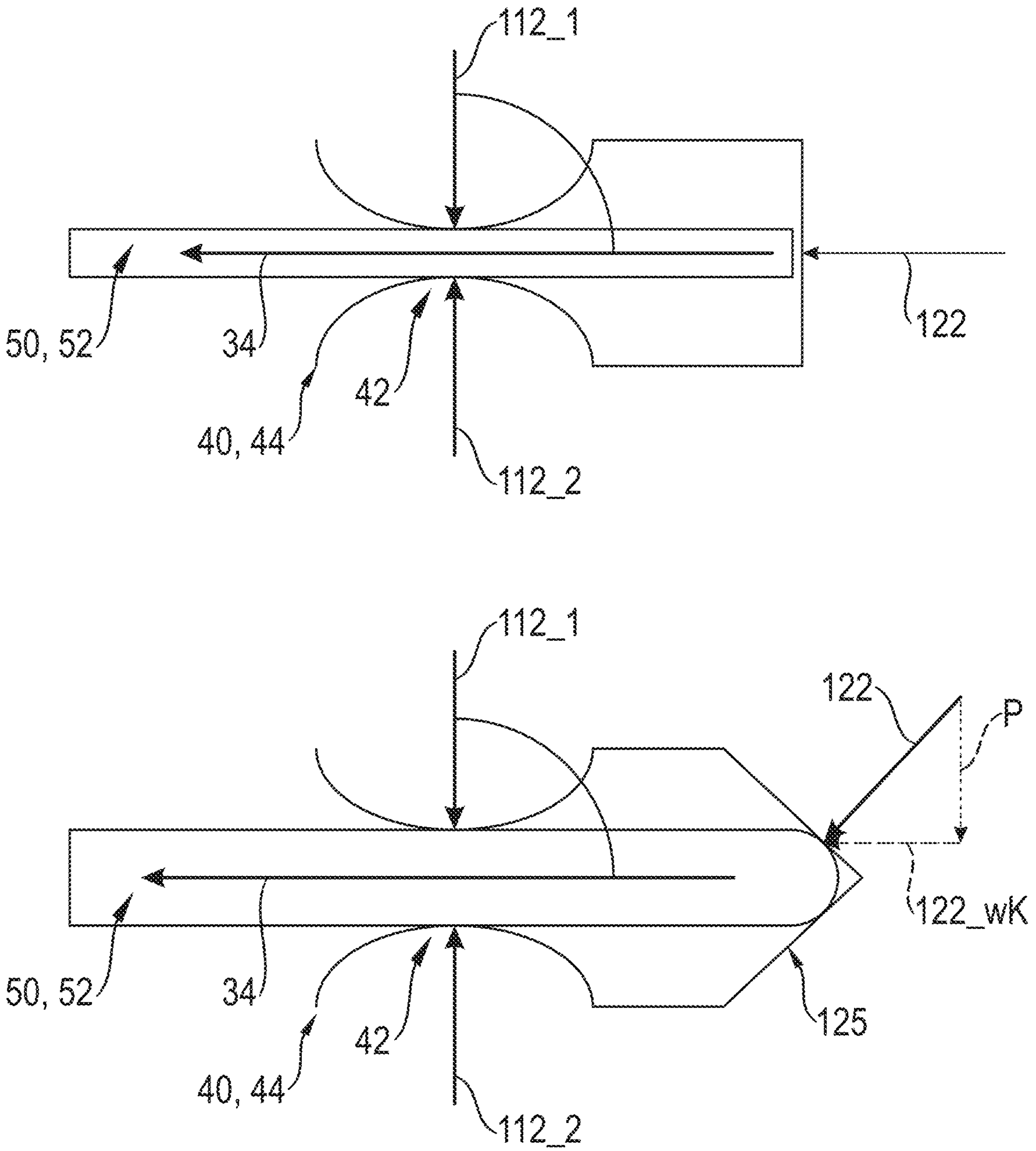
FIG. 9 shows a detailed view of a pair consisting of a male and a female contact partner, wherein the contact normal forces have different orientations.

FIG. 9 shows a detailed view of a pair 70 of a male contact partner 50 and a female contact partner 40, wherein the contact normal forces 112, 122 have different orientations. Here, in the upper half of FIG. 9, the first contact normal force 112 is preferably oriented substantially perpendicular to the insertion direction 34, while the second contact normal force 122 is oriented substantially parallel to the insertion direction 34. The quarter arc between the arrows, which are intended to symbolize the contact normal forces 112, 122, indicates the right angle existing between the contact normal forces 112, 122. In the case of a "straight stop" as shown in the upper half of FIG. 9, the second contact normal force 122 acts substantially completely in the direction of the insertion direction 34. Since the female contact partner 40 usually has legs 44 with tapers 42 that can press on the blade 52 of the male contact partner 50 from several spatial directions, two first contact normal forces 112_1 and 112_2 acting on the blade 52 from different spatial directions are shown symbolically for the first contact normal force 112 in the upper half of FIG. 9.

In the lower half of FIG. 9, the second contact normal force 122 forms an angle Delta (see FIG. 10) with the first contact normal force 112. The second contact normal force 122 can be projected onto the insertion direction 34 by a projection P, which is symbolized by a dashed vertical downward arrow in the lower half of FIG. 9, thereby obtaining the substantial force component 122_wK of the second contact normal force 122. The main force component 122_wK represents that component of the second contact normal force 122 that acts in the insertion direction 34. The size of this component, i.e. the size of the main force component 122_wK of the second contact normal force 122, preferably depends on the angle Delta. The smaller the angle Delta, the smaller the main force component 122_wK of the second contact normal force 122, i.e., the smaller the component of the second contact normal force 122 that acts in the insertion direction 34. The main force component 122_wK of the second contact normal force 122 is represented in the lower half of FIG. 9 by a thick dashed horizontal arrow pointing to the left, which runs substantially parallel to the insertion direction 34 and substantially perpendicular to the projection P.

In particular, the lower half of FIG. 9 shows a "slanted stop", in which the blade 52 of the male contact partner 50 meets slanted contact surfaces 125 of the female contact partner 40. The slanted position of the contact surfaces 125 of the female contact partner 40 results in the slanted position of the second contact normal force 122, resulting in a reduced second contact normal force 122_wK acting in the insertion direction 34. The phrase "reduced second contact normal force 122_wK" preferably means in the context of the invention that the main force component 122_wK in the insertion direction 34 is always smaller than that second contact normal force 122 which results when the contact normal forces 112, 122 are perpendicular to one another, as in the upper half of FIG. 9. It has been shown that interfaces with two contact normal forces acting in different directions are particularly well suited for the transmission of electrical energy and high currents under rough working conditions, such as on a construction site.

Figure 10:
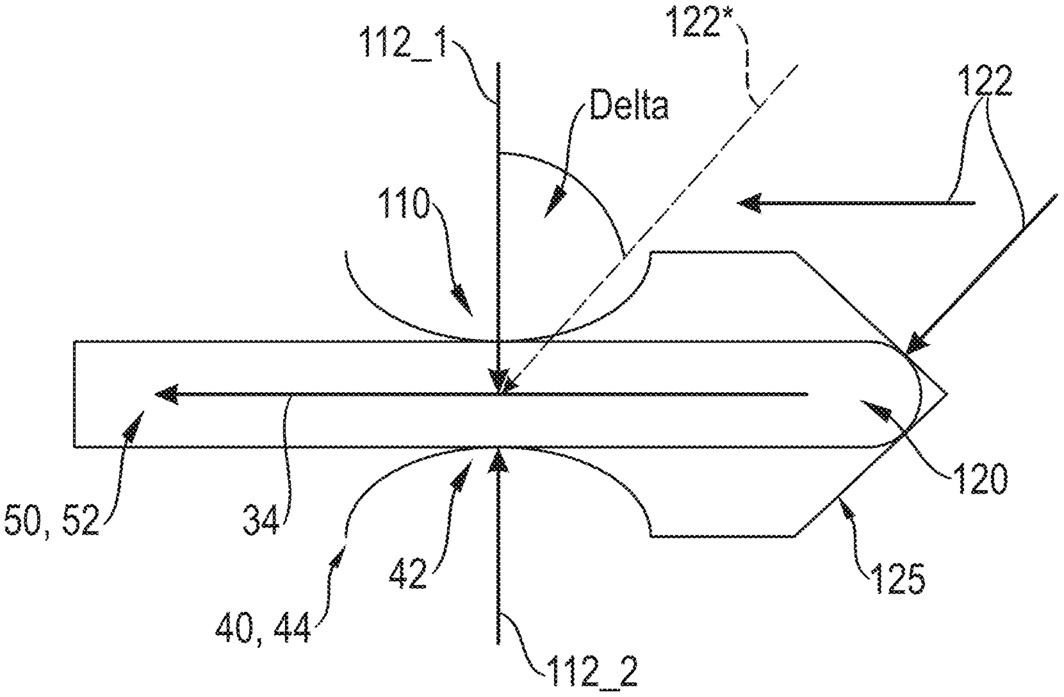
FIG. 10 shows a representation of the angle Delta between the first and the second contact normal force.

FIG. 10 shows a representation of the angle Delta between the first contact normal force 112 and the second contact normal force 122. The angle Delta is illustrated by the arc formed between the first contact normal force 112 and a displacement 122* of the second contact normal force 122. The displacement 122* of the second-contact normal force 122 is symbolized by the dashed, downwardly sloping arrow, the tip of which coincides with the tip of the first contact normal force 112 and forms the vertex of the angle Delta. The displacement path to obtain the displacement 122* of the second contact normal force 122 is symbolized in FIG. 10 by the horizontal arrow drawn between the displacement 122* and the second contact normal force 122 and pointing to the left. The angle between the first contact normal force 112 and the displacement 122* of the second contact normal force 122 preferably corresponds to the angle Delta between the first contact normal force 112 and the second contact normal force 122. The first contact normal force 112 acts in the first contact region 110 and the second contact normal force 122 acts in the second contact region 120.

LIST OF REFERENCE SIGNS

10 Power tool
20 Energy supply device
30 Interface
32 Contact region
34 Insertion direction
36 Current conductor
40 Female contact partner
42 Taper
44 Leg of female contact partner
46 Protruding region of the female contact partner/plateau
47 Contact surface of the female contact partner
48 Interior of the female contact partner
49 Stop of the female contact partner
50 Male contact partner
52 Blade
54 Front region of the male contact partner/tip
56 Contact surface of the male contact partner
59 Ramp
60 Means for reducing a relative movement
62 Elastic element
70 Unit of female and male contact partners
80 Receiving device
90 Communication element
92 Communication link
100 System
110 First contact region
112 First contact normal force
120 Second contact region
122 Second contact normal force
125 Slanted contact surfaces of the female contact partner

What is claimed is:

1. A system comprising:

a power tool; and an energy supply device for supplying the power tool with electrical energy, the energy supply device releasably connectable to the power tool via an interface, the interface including a female contact partner and a male contact partner in contact with each other in a first contact region and in a second contact region, the first contact region definable by a first contact normal force and the second contact region is definable by a second contact normal force, the first contact normal force and the second contact normal force have different orientations, the first contact normal force at the first contact region and the second contact normal force at the second contact region forming an angle with one another, wherein the angle lies in an angular range from 10 to 90 degrees.

2. The system as recited in claim 1 wherein the first contact normal force and the second contact normal force are oriented substantially perpendicular to one another.

3. The system as recited in claim 1 wherein the interface has an insertion direction and when in contact one of the first and second contact normal forces is oriented substantially perpendicular to the insertion direction or the other of the first and second contact normal forces is oriented substantially parallel to the insertion direction.

4. The system as recited in claim 3 wherein the interface includes at least one elastic means for reducing a relative movement between the contact partners, wherein the elastic means for reducing the relative movement between the contact partners is designed to act on the male contact partner or on the female contact partner, the at least one elastic means for reducing the relative movement being assigned to the receiving device.

5. The system as recited in claim 1 wherein the second contact region includes stops and contact surfaces, the stops and contact surfaces being oriented substantially perpendicular to an insertion direction of the interface.

6. The system as recited in claim 1 wherein a front region of the male contact partner is flattened in order to form a contact surface.

7. The system as recited in claim 1 wherein the first contact normal force and the second contact normal force form an angle with one another, wherein the angle lies in an angular range from 45 to 90 degrees.

8. The system as recited in claim 1 wherein the first contact normal force and the second contact normal force form an angle with one another, wherein the angle lies in an angular range from 60 to 90 degrees.

9. The system as recited in claim 1 wherein the interface includes at least one elastic means for reducing a relative movement between the contact partners, wherein the elastic means for reducing the relative movement between the contact partners is designed to act on the male contact partner or on the female contact partner.

10. The system as recited in claim 9 wherein the at least one elastic means for reducing a relative movement between the contact partners is configured to generate a bias, wherein the bias is oriented substantially perpendicular to a first contact normal force.

11. The system as recited in claim 9 wherein the male or female contact partner on which the elastic means for reducing the relative movement acts is movably mounted.

12. The system as recited in claim 9 wherein the at least one elastic means for reducing the relative movement is assigned to a contact pair of the female contact partner and the male contact partner.

13. The system as recited in claim 1 wherein the male contact partner and a female contact partner form a unit decoupled in a connected state from a movement of the energy supply device or the power tool.

14. The system as recited in claim 1 wherein the interface includes a receiving device for receiving the female contact partner or the male contact partner.

15. An energy supply device for use in the system as recited in claim 1, the energy supply device comprising at least one energy storage cell, wherein the at least one energy storage cell has an internal resistance DCR_I of less than 10 milliohms.

16. An energy supply device for use in the system as recited in claim 1, the energy supply device comprising at least one energy storage cell, wherein the at least one energy storage cell has a surface area A and a volume V, wherein the ratio A/V of the surface area to the volume is greater than six times the inverse of the cube root of the volume.

17. The system as recited in claim 1 wherein the male contact partner has a blade and two contact surfaces separate from the blade, the female contact partner having two contact arms with stops at ends of the contact arms, the first contact region being defined by contact of the blade with one of the contact arms, the first contact normal force being perpendicular to an insertion direction, the second contact region being defined by contact of one of the stops with one of the two contact surfaces, the second contact normal force being parallel to the insertion direction.

18. The system as recited in claim 1 wherein the male contact partner has a blade, the female contact partner having two contact arms connected by a stop, the first contact region being defined by a contact of the blade with one of the contact arms, the first contact normal force being perpendicular to an insertion direction, the second contact region being defined by contact of a tip of the blade with the stop.

19. The systems as recited in claim 18 wherein the stop is slanted with respect to an insertion direction.

20. An interface for transmitting electrical energy between a power tool and an energy supply device, the interface comprising:

a male contact partner and a female contact partner, as well as at least one elastic means for reducing a relative movement between the male and female contact partners, wherein the female contact partner and the male contact partner are in contact with each other in at least a first contact region and in a second contact region, the first contact region definable by a first contact normal force and the second contact region definable by a second contact normal force, the first contact normal force and the second contact normal force having different orientations, the first contact normal force at the first contact region and the second contact normal force at the second contact region forming an angle with one another, wherein the angle lies in an angular range from 10 to 90 degrees.

21. A system comprising:

a power tool; and an energy supply device for supplying the power tool with electrical energy, the energy supply device releasably connectable to the power tool via an interface, the interface including a female contact partner and a male contact partner in contact with each other in a first contact region and in a second contact region, the first contact region definable by a first contact normal force and the second contact region is definable by a second contact normal force, the first contact normal force and the second contact normal force have different orientations, the energy supply device comprising at least one energy storage cell, wherein the at least one energy storage cell has a surface area A and a volume V, wherein the ratio A/V of the surface area to the volume is greater than six times the inverse of the cube root of the volume.

22. The energy supply device as recited in claim 21 wherein the ratio A/V is greater than eight times the inverse of the cube root of the volume.

23. The energy supply device as recited in claim 21 wherein the ratio A/V is greater than ten times the inverse of the cube root of the volume.

* * * * *